(12) United States Patent
Wetzel et al.

(10) Patent No.: US 10,974,589 B2
(45) Date of Patent: Apr. 13, 2021

(54) CAPLESS CLOSURE ASSEMBLY FOR FUEL-TANK FILLER PIPE

(71) Applicant: Stant USA Corp., Connersville, IN (US)

(72) Inventors: Paul C. Wetzel, Oxford, OH (US); Louis T. Frank, Connersville, IN (US)

(73) Assignee: Stant USA Corp., Connersville, IN (US)

( * ) Notice: Subject to any disclaimer, the term of this patent is extended or adjusted under 35 U.S.C. 154(b) by 28 days.

(21) Appl. No.: 16/599,579

(22) Filed: Oct. 11, 2019

(65) Prior Publication Data

US 2020/0361310 A1     Nov. 19, 2020

Related U.S. Application Data

(63) Continuation-in-part of application No. 16/514,037, filed on Jul. 17, 2019.

(60) Provisional application No. 62/878,016, filed on Jul. 24, 2019, provisional application No. 62/847,499, filed on May 14, 2019.

(51) Int. Cl.
    *B60K 15/04*     (2006.01)

(52) U.S. Cl.
    CPC ...... *B60K 15/04* (2013.01); *B60K 2015/0461* (2013.01)

(58) Field of Classification Search
    CPC ........................ B60K 15/04; B60K 2015/0461
    See application file for complete search history.

(56) References Cited

U.S. PATENT DOCUMENTS

| | | | | |
|---|---|---|---|---|
| 6,189,581 B1 ‡ | 2/2001 | Harris | .................... | B60K 15/04 |
| | | | | 137/58 |
| 6,431,228 B2 ‡ | 8/2002 | Foltz | .................... | B60K 15/05 |
| | | | | 141/30 |
| 6,691,750 B1 ‡ | 2/2004 | Foltz | .................... | B60K 15/04 |
| | | | | 141/35 |
| 6,732,840 B2 ‡ | 5/2004 | Ikeda | .................... | F16D 51/20 |
| | | | | 188/10 |
| 6,755,057 B2 ‡ | 6/2004 | Foltz | .................... | B60K 15/04 |
| | | | | 141/31 |
| 7,882,862 B2 ‡ | 2/2011 | DeCapua | ............ | B60K 15/035 |
| | | | | 141/29 |
| 10,000,117 B2 ‡ | 6/2018 | Giles | .................... | G01F 9/001 |
| 10,065,496 B2 ‡ | 9/2018 | Frank | .................... | B60K 15/04 |
| 10,226,996 B2 ‡ | 3/2019 | Giles | .................... | B60K 15/04 |
| 2013/0213963 A1* | 8/2013 | Chretien | .................. | B67D 7/06 |
| | | | | 220/86.2 |
| 2014/0096835 A1 | 4/2014 | Yager et al. | | |
| 2014/0346171 A1 ‡ | 11/2014 | Yamamoto | ............ | B60K 15/04 |
| | | | | 220/86 |
| 2015/0001215 A1 | 1/2015 | Kito et al. | | |

(Continued)

FOREIGN PATENT DOCUMENTS

| | | | |
|---|---|---|---|
| JP | 2018095153 A | | 6/2018 |
| KR | 2019990003290 U | ‡ | 1/1999 |
| KR | 2019990003290 U | | 1/1999 |

*Primary Examiner* — Jason K Niesz

(74) *Attorney, Agent, or Firm* — Barnes & Thornburg LLP

(57) ABSTRACT

A capless filler pipe closure is provided for a tank filler pipe. The capless closure permits a fuel pump nozzle to be inserted into the tank filler pipe without first removing a fuel cap form the outer end of the tank filler pipe.

28 Claims, 13 Drawing Sheets

(56) References Cited

U.S. PATENT DOCUMENTS

| | | | |
|---|---|---|---|
| 2015/0048087 A1 ‡ | 2/2015 | Hagano | F16K 1/50 |
| | | | 220/86 |
| 2016/0009173 A1 ‡ | 1/2016 | Sperando | B60K 15/05 |
| | | | 220/86 |
| 2016/0048087 A1 ‡ | 2/2016 | Yang | G03F 7/707 |
| | | | 355/72 |
| 2016/0311316 A1 | 10/2016 | Kerstein | |
| 2017/0072790 A1 ‡ | 3/2017 | Frank | B60K 15/04 |
| 2017/0158048 A1 ‡ | 6/2017 | Giles | B60K 15/04 |
| 2019/0023125 A1 ‡ | 1/2019 | Costa | B60K 15/04 |

\* cited by examiner

‡ imported from a related application

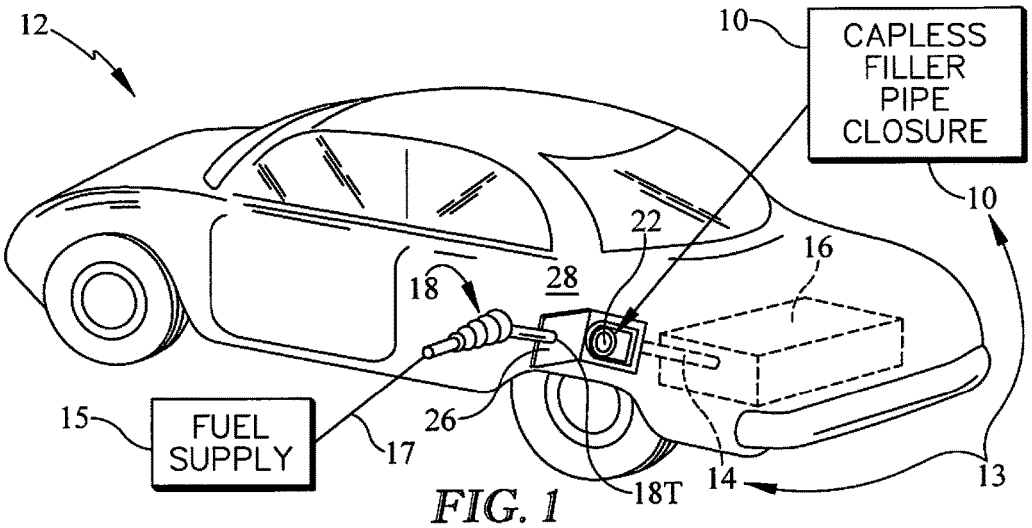
FIG. 1
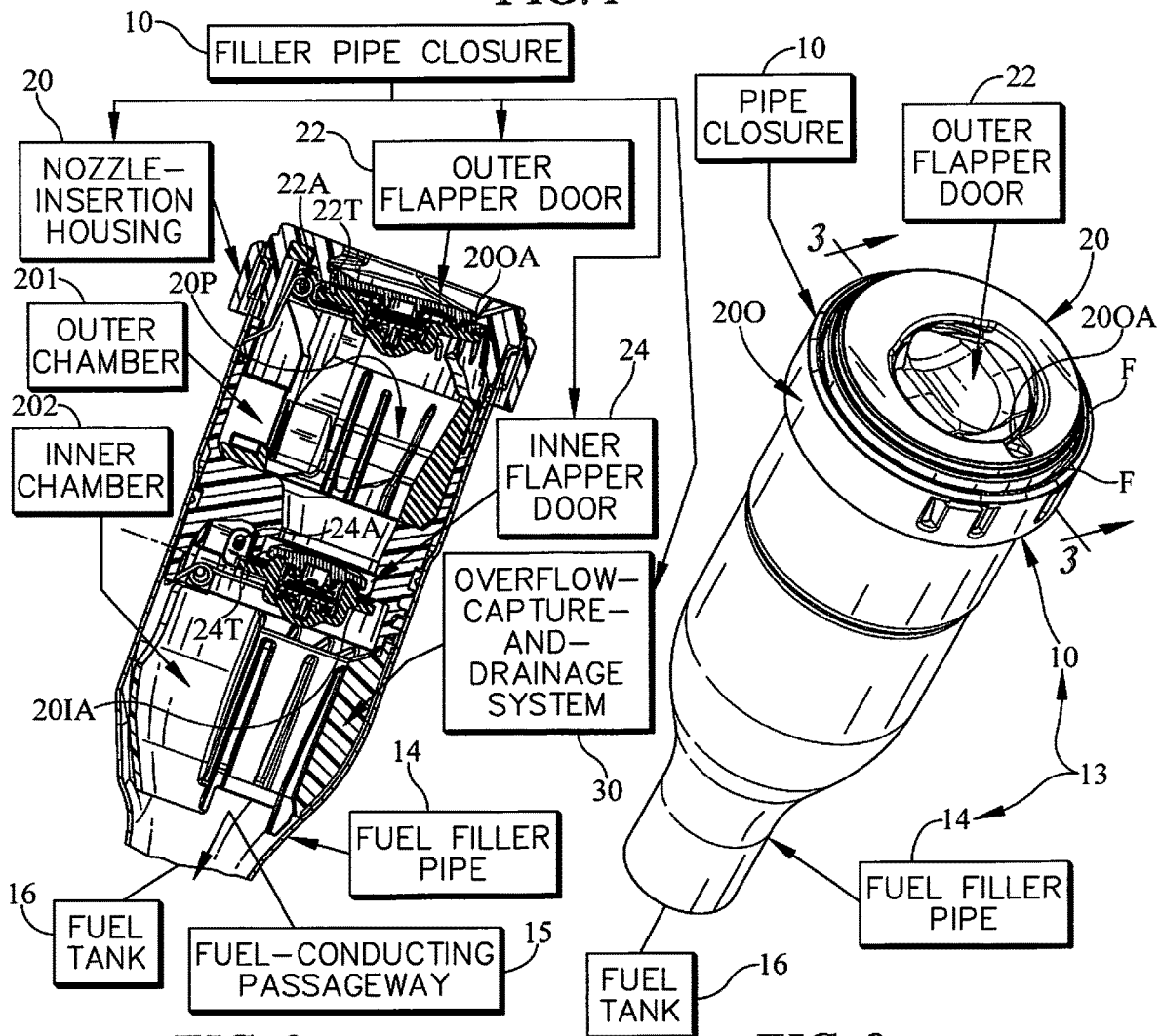
FIG. 3
FIG. 2

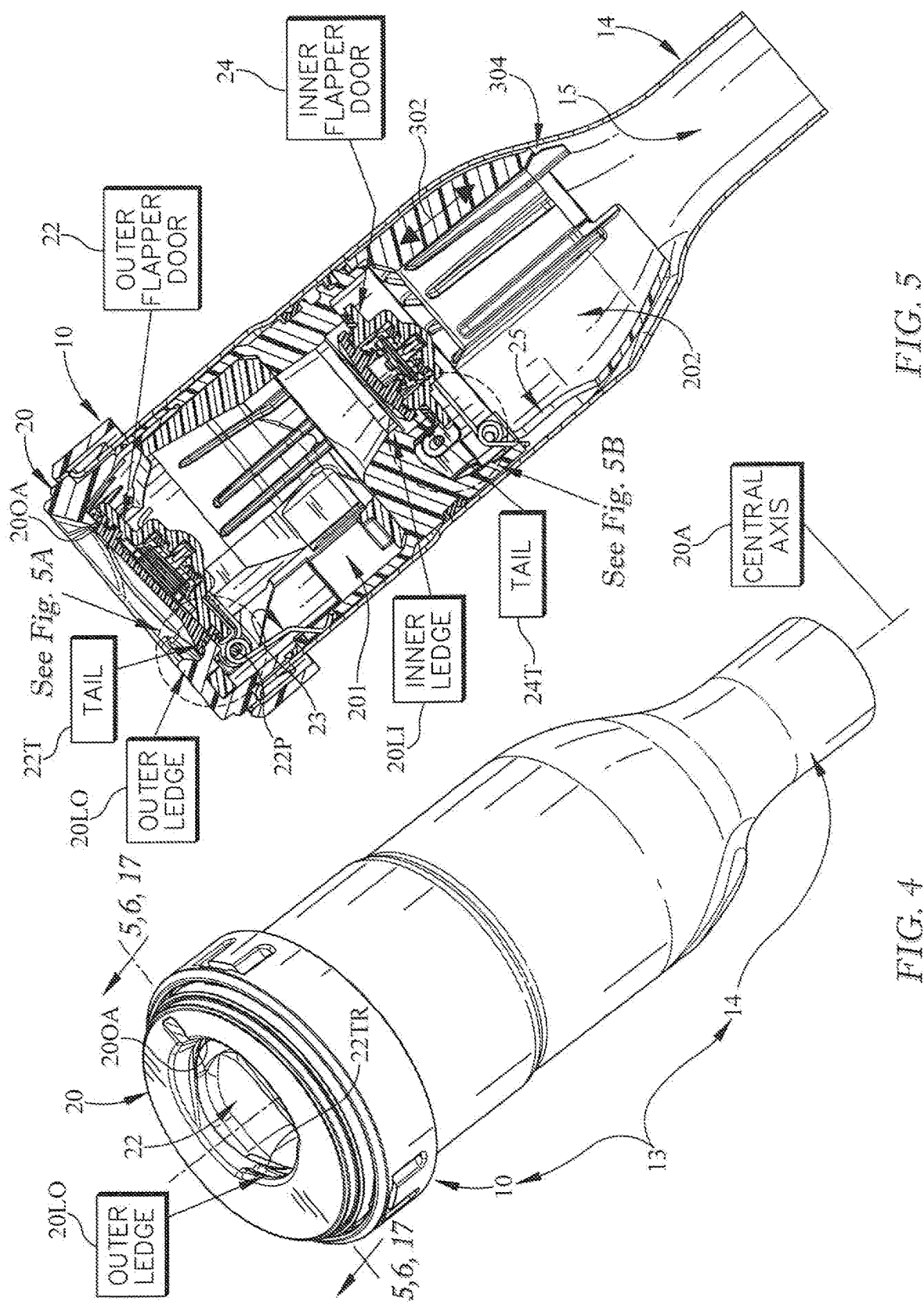

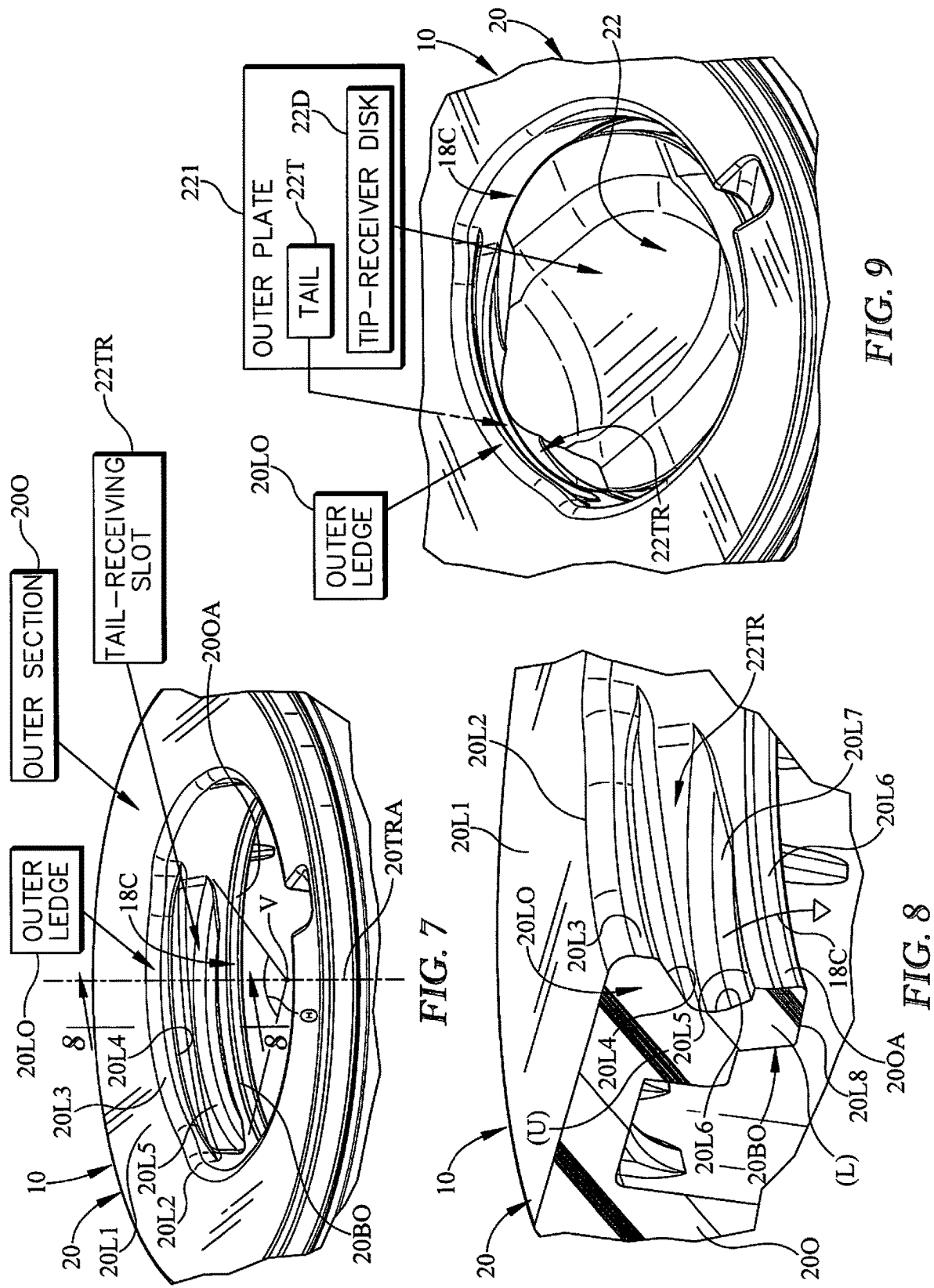

CAPLESS CLOSURE ASSEMBLY FOR FUEL-TANK FILLER PIPE

PRIORITY CLAIM

This application claims priority under 35 U.S.C. § 119(e) to U.S. Provisional Application No. 62/878,016, filed Jul. 24, 2019, and is a continuation-in-part to U.S. application Ser. No. 16/514,037 filed Jul. 17, 2019, which claims priority under 35 U.S.C. § 119(e) to U.S. Provisional Application No. 62/847,499, filed May 14, 2019, and each of which is expressly incorporated by reference herein.

BACKGROUND

The present disclosure relates to a filler pipe closure for a tank filler pipe. More particularly, the present disclosure relates to a capless closure that permits a fuel-dispensing pump nozzle to he inserted into a tank filler pipe to supply fuel to a fuel tank and closes the tank filler pipe when the fuel-dispensing pump nozzle is removed from the closure.

Many vehicles include a fuel tank, a fuel-tank filler pipe coupled to the fuel tank to communicate liquid fuel from a fuel-dispensing pump nozzle to the fuel tank, and a closure coupled to the fuel-tank filler pipe to seal the fuel-tank filler pipe. During refueling, the fuel-dispensing pump nozzle is passed by a user first through an outer chamber associated with an outer end of the fuel-tank filler pipe that is open to the atmosphere and then through a nozzle-receiving aperture into a fuel-conducting passageway formed in the fuel-tank filler pipe. Then the pump nozzle is actuated by the user to cause liquid fuel discharged by the pump nozzle to flow through the fuel-conducting passageway into the fuel tank.

SUMMARY

According to the present disclosure, a fuel-tank filler apparatus comprises a filler pipe closure that is adapted to be coupled to a fuel-tank fuel filler pipe. In illustrative embodiments, the filler pipe closure is a capless system that includes a nozzle-insertion housing that is configured to mate with an outer end of a fuel filler pipe to provide a fill tube that leads to a vehicle fuel tank. The nozzle-insertion housing is formed to include an outer chamber, an outer nozzle-receiving aperture that is open to the atmosphere and to the outer chamber, and an inner nozzle-receiving aperture that is located to interconnect the outer chamber in fluid communication with an inner chamber that communicates with a fuel-conducting passageway formed in the fuel filler pipe when the nozzle-insertion housing is mated with the outer end of the fuel filler pipe.

In illustrative embodiments, the filler pipe closure further includes (1) a spring-biased nozzle-actuated outer flapper door mounted on the nozzle-insertion housing for movement relative to the nozzle-insertion housing between a closed position closing the outer nozzle-receiving aperture formed in the nozzle-insertion housing and an opened position opening that outer nozzle-receiving aperture and (2) a spring-biased nozzle-actuated inner flapper door mounted on the nozzle-insertion housing for movement relative to the nozzle-insertion housing between a closed position closing the inner nozzle-receiving aperture formed in the nozzle-insertion housing and an opened position opening that inner nozzle-receiving aperture. During refueling, the tip of a fuel-dispensing pump nozzle is moved by a user first to engage the normally closed outer flapper door and then to move the outer flapper door against a closing force applied by a companion spring to assume the opened position. The nozzle tip is then passed through the outer chamber to engage the normally closed inner flapper door and then move the inner flapper door against a closing force applied by a companion spring to assume the opened position. The nozzle tip is then moved past the opened inner flapper door into the inner chamber that communicates with the fuel-conducting passageway formed in the fuel filler pipe. The pump nozzle may then be actuated by the user to dispense fuel into the fuel-conducting passageway that leads to the fuel tank.

In illustrative embodiments, the pivotable outer flapper door includes a rear door-pivot portion that is located near an outer door-pivot axis associated with the outer flapper door. Such a rear door-pivot portion is positioned to lie under a radially inwardly projecting outer ledge included in the nozzle-insertion housing when the outer flapper door is in the closed position. Such placement locates the rear door-pivot portion of the pivotable outer flapper door in an arcuate slot formed in the nozzle-insertion housing to hide and shield the rear door-pivot portion so that it is not exposed to engagement with the tip of the moving fuel-dispensing pump nozzle as the pump nozzle pivots the outer flapper door to its opened position during insertion of the pump nozzle into the outer chamber. Instead, the tip of the moving pump nozzle engages a dedicated tip-receiver disk that is included in the pivotable outer flapper door and coupled to the hidden and shielded rear door-pivot portion of the outer flapper door.

In illustrative embodiments, the rear door-pivot portion of the pivotable outer flapper door is a rearwardly extending tail that is arranged to extend in a rearward direction away from a central axis of the nozzle-insertion housing when the outer flapper door occupies the closed position. The arcuate slot that is formed in the nozzle-insertion housing to lie under the radially inwardly projecting outer ledge is sized and shaped to provide tail-receiver means for receiving the rearwardly extending tail of the outer flapper door in a hidden and shielded position located under the outer ledge and outside of the outer chamber formed in the nozzle-insertion housing when the outer flapper door occupies the closed position. In such a hidden and shielded position, the rearwardly extending tail of the outer flapper door is not exposed to engagement with a tip of a moving fuel-dispensing pump nozzle as the pump nozzle moves inwardly through an outer tip-entry channel formed in the nozzle-insertion housing toward the normally closed pivotable outer flapper door at the start of a tank refueling activity.

In illustrative embodiments, the pivotable inner flapper door includes a rear door-pivot portion that is located near an inner door-pivot axis associated with the inner flapper door. Such a rear door-pivot portion is positioned to lie under a radially inwardly projecting inner ledge included in the nozzle-insertion housing when the inner flapper door is in the closed position. Such placement locates the rear door-pivot portion of the pivotable inner flapper door in a space formed in the nozzle-insertion housing to hide and shield the rear door-pivot portion so that it is not exposed to engagement with the tip of the moving fuel-dispensing pump nozzle as the pump nozzle pivots the inner flapper door to its opened position during insertion of the pump nozzle into the inner chamber. Instead, the tip of the moving pump nozzle engages a dedicated tip-receiver disk that is included in the pivotable inner flapper door and coupled to the hidden and shielded rear door-pivot portion of the inner flapper door.

In illustrative embodiments, the rear door-pivot portion of the pivotable inner flapper door is a rearwardly extending tail that is arranged to extend in a rearward direction away form the central axis of the nozzle-insertion housing when the inner flapper door occupies the closed position. The space that is formed in the nozzle-insertion housing to lie under the radially inwardly projecting inner ledge is sized and shaped to provide tail-receiver means for receiving the rearwardly extending tail of the inner flapper door in a hidden and shielded position located under the inner ledge and outside of the inner chamber formed in the nozzle-insertion housing when the inner flapper door occupies the closed position. In such a hidden and shielded position, the rearwardly extending tail of the inner flapper door is not exposed to engagement with the tip of the moving fuel-dispensing pump nozzle as the pump nozzle moves inwardly through the outer chamber formed in the nozzle-insertion housing toward the normally closed pivotable inner flapper door during a tank-refueling activity.

Additional features of the present disclosure will become apparent to those skilled in the art upon consideration of the following detailed description of illustrative embodiments exemplifying the best mode of carrying out the present disclosure as presently perceived.

BRIEF DESCRIPTION OF THE DRAWINGS

The detailed description particularly refers to the accompanying figures in which:

FIG. 1 is a perspective view showing an outer filler-pipe access door moved to an opened position relative to a vehicle body panel to expose an illustrative capless filler pipe closure that is coupled to a fuel filler pipe leading to a vehicle fuel tank and showing a fuel-dispensing pump nozzle that is coupled to a fuel supply and configured to be inserted into the capless filler pipe closure during vehicle refueling to discharge liquid fuel into the fuel filler pipe leading to the vehicle fuel tank;

FIG. 2 is an enlarged perspective view of the capless filler pipe closure of FIG. 1 coupled to the fuel filler pipe to provide a fill tube for a fuel tank and showing an exposed portion of a nozzle-insertion housing that is coupled to an outer end of the fuel filler pipe and formed to include an outer nozzle-receiving aperture and also showing a pivotable outer flapper door closing the outer nozzle-receiving aperture;

FIG. 3 is a sectional view taken along line 3-3 of FIG. 1 of a fuel-tank filler apparatus in accordance with the present disclosure showing an illustrative nozzle-insertion housing mounted in the outer end of a fuel filler pipe, and showing that the capless filler pipe closure further includes a spring-loaded nozzle-actuated outer flapper door located in an outer end of the nozzle-insertion housing and yieldably biased to assume a closed position closing an outer nozzle-receiving aperture formed in an outer section of the nozzle-insertion housing, a spring-loaded inner flapper door yieldably biased to assume a closed position closing an inner nozzle-receiving aperture formed in an inner section of the nozzle-insertion housing and arranged to lie in spaced-apart relation to the outer flapper door to define an outer chamber of the nozzle-insertion housing therebetween, and an overflow-capture-and-drainage system configured in accordance with the present disclosure to conduct any overflow liquid fuel extant in an inner chamber formed in the nozzle-insertion housing into a fuel-conducting passageway formed in the fuel filler pipe for delivery to the fuel tank;

FIG. 4 is another perspective view of the capless filler pipe closure of FIG. 2 after it has been rotated about a central axis to show that the rearwardly extending tail of the pivotable outer flapper door is hidden and shielded in a tail receiver located under a radially inwardly projecting outer ledge included in the outer section of the nozzle-insertion housing when the pivotable outer flapper door is in the closed position so that the rearwardly extending tail is not exposed to engagement with a tip of the fuel-dispensing pump nozzle during engagement of the tip with the pivotable outer flapper door as the pump nozzle is inserted into the outer chamber of the nozzle-insertion housing as suggested in FIGS. 11-16;

FIG. 5 is a sectional view taken along line 5-5 of FIG. 4 showing that (1) the rearwardly extending tail of the pivotable outer flapper door is arranged to extend into a tail-receiving slot formed in the outer section of the nozzle-insertion housing and located under the radially inwardly projecting outer ledge included in the outer section so that the rearwardly extending tail is not exposed to engagement with the tip of a moving pump nozzle as the tip engages the outer flapper door during insertion of the pump nozzle into the outer chamber of the nozzle-insertion housing as suggested in FIGS. 11-16 and (2) a rearwardly extending tail of the pivotable inner flapper door is arranged to extend into a tail-receiving space provided under a radially inwardly projecting inner ledge included in an inner section of the nozzle-insertion housing so that the rearwardly extending tail is not exposed to engagement with the tip of the moving pump nozzle as the tip engages the inner flapper door during insertion of the pump nozzle into the inner chamber of the nozzle-insertion housing;

FIG. 7 is an enlarged perspective view of a top portion of the outer section of the nozzle-insertion housing showing formation of a circumferentially extending tail-receiving slot under the radially inwardly extending outer ledge;

FIG. 8 is an enlarged partial sectional view taken generally along line 8-8 of FIG. 7 showing a portion of the tail-receiving slot under the radially inwardly extending outer ledge;

FIG. 9 is a perspective view similar to FIG. 7 showing the pivotable outer flapper door in the closed position to cause the rearwardly extending tail of the outer flapper door to extend into the tail-receiving slot formed in the outer section of the nozzle-insertion housing;

DETAILED DESCRIPTION

Figure 3A:
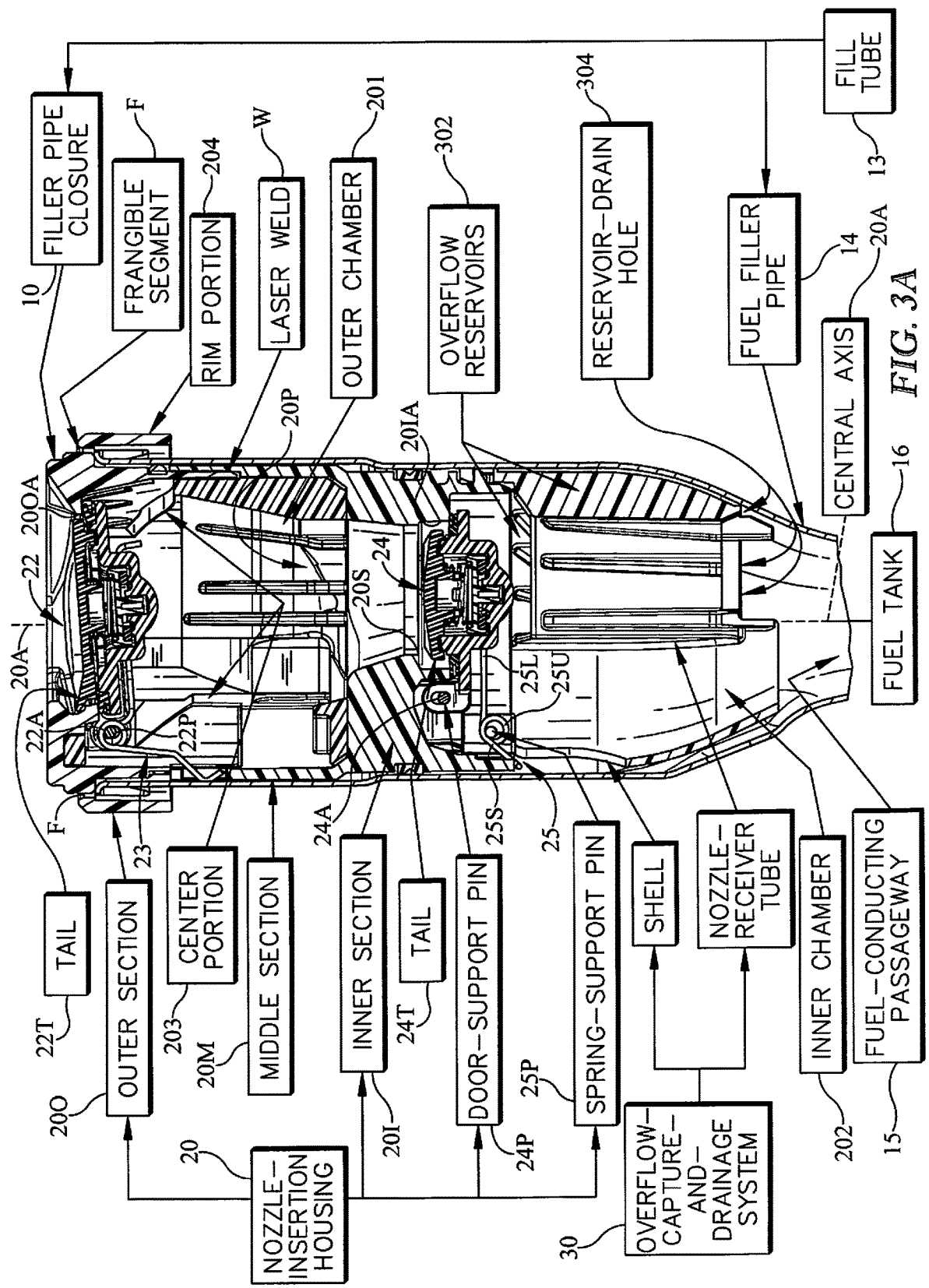
FIG. 3A is an enlarged view of FIG. 3 showing that (1) an outer section of the nozzle-insertion housing is formed to include a tail receiver that opens toward a central axis of the nozzle-insertion housing to receive, hide and shield a rearwardly extending tail of the outer flapper door that extends away from the central axis when the outer flapper door occupies the closed position to minimize damage to the pivotable outer flapper door as a tip of a fuel-dispensing pump nozzle is inserted into the capless filler pipe closure to engage the outer flapper door and move the outer flapper door to an opened position, (2) the pivotable inner flapper door is configured and arranged to include a hidden and shielded rearwardly extending tail located under a radially inwardly projecting inner ledge included in the inner section of the nozzle-insertion housing to minimize damage to the pivotable inner flapper door as a fuel-dispensing pump nozzle is inserted into the capless filler pipe closure to dispense liquid fuel into a fuel-conducting passageway formed in the fuel filler pipe and arranged to lead to a fuel tank, and (3) the liquid-fuel overflow-capture-and-drainage system is arranged and configured to manage collection and drainage of any overflow liquid fuel that is able to flow outwardly in the inner chamber located above a pump-discharge-shut-off (aperture opening) aperture formed in the fuel-dispensing pump nozzle.

A capless filler pipe closure 10 is provided in a vehicle 12 to close a fuel filler pipe 14 extending from a fuel tank 16 onboard vehicle 12 and to accept a fuel-dispensing pump nozzle 18 during fuel tank refueling as suggested in FIG. 1. Filler pipe closure 10 cooperates with fuel filler pipe 14 to define a fill tube 13 for conducting liquid fuel from nozzle 18 to fuel tank 16. Pump nozzle 18 is coupled to a fuel supply 15 by a hose 17.

Capless filler pipe closure 10 is configured to close off fuel filler pipe 14 from the atmosphere until fuel-dispensing pump nozzle 18 is inserted into closure 10. Filler pipe closure 10 includes a nozzle-insertion housing 20 coupled to an outer end of fuel filler pipe 14 as suggested in FIGS. 2 and 3. Nozzle-insertion housing 20 is formed to include a passageway 20P that extends in an outer chamber 201 of nozzle-insertion housing 20 from an outer nozzle-receiving aperture 20OA to an inner nozzle-receiving aperture 20IA as suggested in FIGS. 3, 3A, and 3B. During fuel tank refueling, a user inserts the fuel-dispensing pump nozzle 18 into passageway 20P in nozzle-insertion housing 20 until a distal tip 18T of nozzle 18 extends into an inner chamber 202 of nozzle-insertion housing 20 and communicates with a fuel-conducting passageway 15 formed in fuel filler pipe 14 to transfer fuel discharged by nozzle 18 to fuel tank 16 through fuel filler pipe 14.

Filler pipe closure 10 also includes outer and inner flapper doors 22, 24 located inside nozzle-insertion housing 20 along nozzle-receiving passageway 20P as suggested in FIG. 3. A spring-loaded outer flapper door 22 is mounted on a middle section 20M of nozzle-insertion housing 20 as suggested in FIG. 3A for pivotable movement about an outer door-pivot axis 22A when engaged by tip 18T of moving fuel-dispensing pump nozzle 18. A spring-loaded inner flapper door 24 is mounted on an inner section 20I of nozzle-insertion housing 20 as suggested in FIG. 3A for pivotable movement about an inner door-pivot axis 24A when engaged by the moving nozzle tip 18T.

Figure 3B:
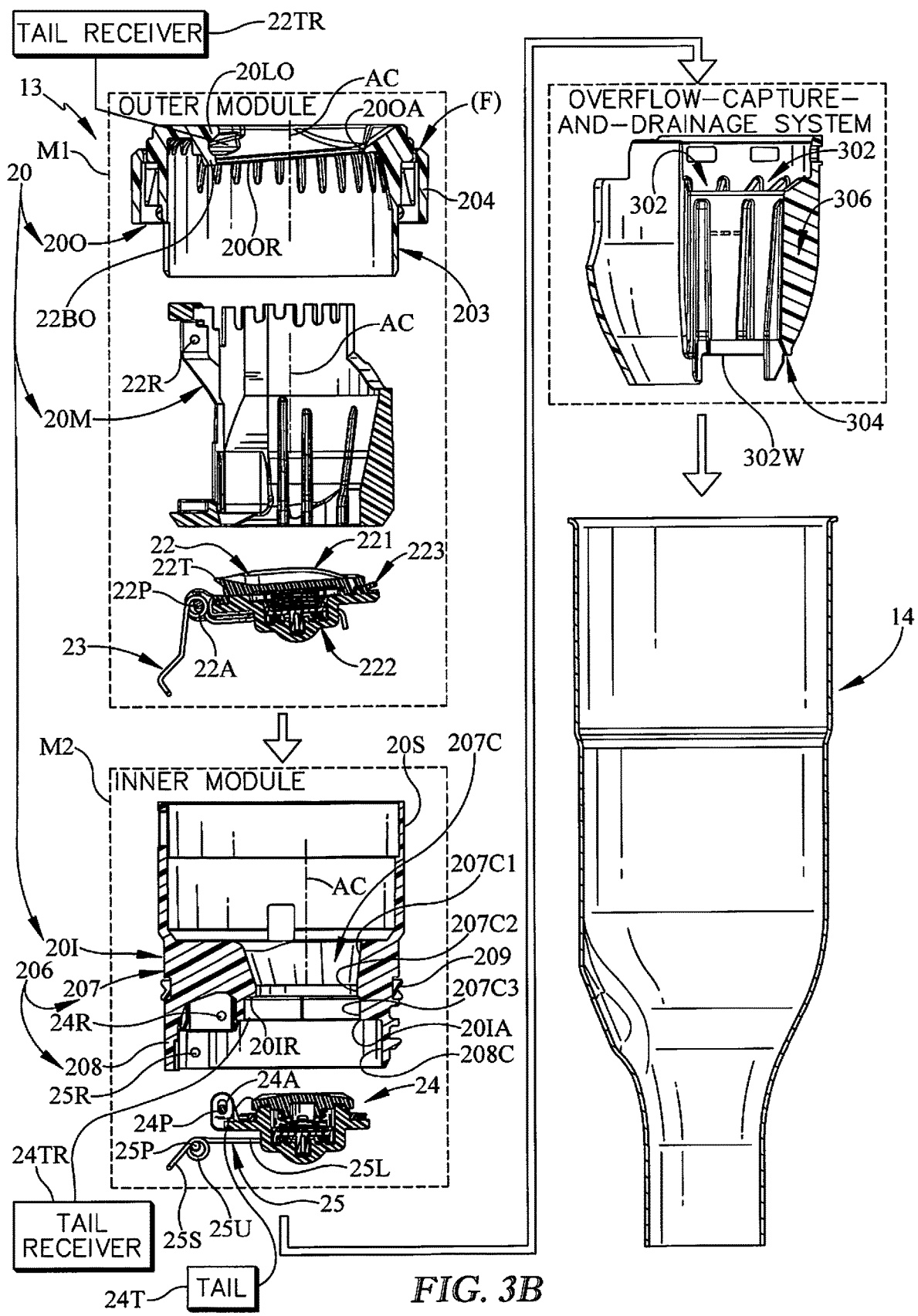
FIG. 3B is an exploded assembly view of the component shown in FIG. 3A suggesting (1) that an outer section of the nozzle-insertion housing is formed to include a tail receiver for a rearwardly extending tail of the outer flapper door, (2) that outer and middle sections of the nozzle-insertion housing cooperate with a spring-loaded outer flapper door to form an outer module of the filler pipe closure, (3) that an inner section of the nozzle-insertion housing is formed to include a tail receiver for a rearwardly extending tail of the inner flapper door and that the inner section cooperates with a spring-loaded inner flapper door to form an inner module of the filler pipe closure, and (4) an overflow-capture-and-drainage system of the filler pipe closure is arranged to lie under the inner and outer modules when the components are assembled as shown in FIG. 3A.

Nozzle-insertion housing 20 illustratively includes an outer section 20O, a middle section 20M, and an inner section 20I as shown, for example in FIGS. 3A and 3B. An outer section 20O of nozzle-insertion housing 20 is visible to an observer as seen in FIG. 2. Outer section 20O is arranged to lie in axially spaced-apart relation to inner section 20I to locate middle section 20M between inner and outer sections 20I, 20O as suggested in FIGS. 3, 3A, and 3B.

Capless filler pipe closure 10 of fill tube 13 is exposed to receive tip 18T of fuel-dispensing pump nozzle 18 during vehicle tank refueling as suggested in FIG. 1. An access door 26 is mounted for pivotable movement relative to a body panel 28 of vehicle 12 to an opened position as suggested in FIG. 1 to expose an outer flapper door 22 and provide access to capless filler pipe closure 10 during tank refueling activities.

Nozzle-insertion housing 20 also includes an outer door-support pin 22P that is configured to extend into a pin receiver 22R formed in middle section 20M of nozzle-insertion housing 20 as suggested in FIGS. 3A and 3B to support outer flapper door 22 for pivotable movement about an outer door-pivot axis 22A between opened and closed positions. In the closed position, outer flapper door 22 mates with an axially inwardly facing annular rim 20OR to form a boundary of outer nozzle-receiving aperture 20OA included in outer section 20O as suggested in FIGS. 3A and 3B.

Nozzle-insertion housing 20 also includes an inner door-support pin 24P that is configured to extend into a pin receiver 24R formed in inner section 20I of nozzle-insertion housing 20 as suggested in FIGS. 3A and 3B to support inner flapper door 24 for pivotable movement about an inner door-pivot axis 24A between opened and closed positions. In the position, inner flapper door 24 mates with an axially inwardly facing annular rim 20IR included in middle section 20M to form a boundary of inner nozzle-receiving aperture 20IA as suggested in FIGS. 3A and 3B.

Figure 5B:
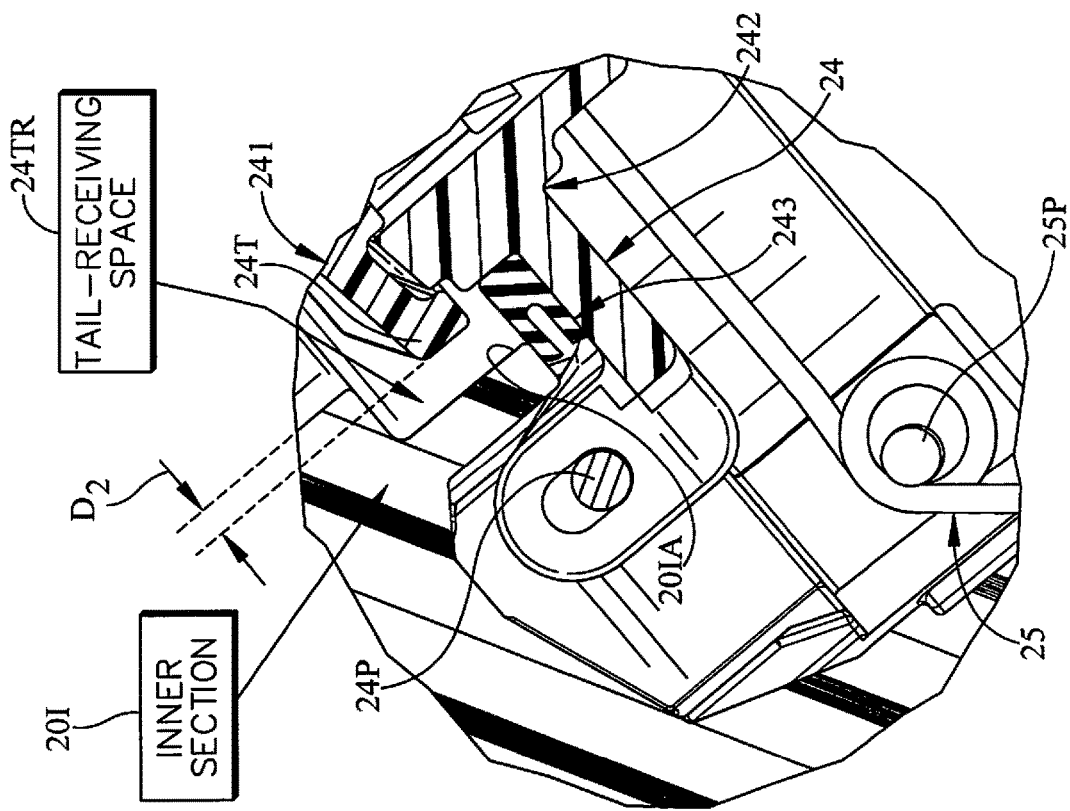
FIG. 5B is an enlarged view of a second circled region in FIG. 5 showing that the tail of the pivotable inner flapper door extends a distance $D_2$ into the tail-receiving space formed in the inner section of the nozzle-insertion housing so that a top surface of the tail faces upwardly toward an underside of the radially inwardly projecting inner ledge included in the inner section.

Filler pipe closure 10 also includes an outer door-closing spring 23 for yieldably pivoting outer flapper door 22 about outer door-pivot axis 22A normally to assume the closed position and an inner door-closing spring 25 for yieldably pivoting inner flapper door 24 about inner door-pivot axis 24A normally to assume the closed position as shown, for example, in FIGS. 3B and 5. While outer door-closing spring 23 is mounted on outer door-support pin 22P and arranged to engage outer flapper door 22 as suggested in FIGS. 3A and 3B, inner door-closing spring 25 is not mounted on inner door-support pin 24P. Instead, in accordance with the present disclosure, inner door-closing spring 25 is mounted on a separate spring-support pin 25P that is located in spaced-apart relation to inner door-support pin 24P as suggested in FIGS. 3A and 3B. Spring-support pin 25P is configured to extend into a pin-receiver 25R formed in inner section 20I of nozzle-insertion housing 20 as suggested in FIGS. 3A and 3B. Inner door-closing spring 25 is arranged to engage a portion of inner flapper door 24A as suggested in FIG. 3A.

A capless filler pipe closure 10 is provided for a fuel filler pipe 14 that is associated with a vehicle fuel tank 16 as suggested in FIGS. 1 and 2. Capless filler pipe closure 10 includes a nozzle-insertion housing 20, an outer flapper door 22 having a rearwardly extending tail 22T, and an inner flapper door 24 having a rearwardly extending tail 24T as suggested in FIGS. 3 and 3A. Nozzle-insertion housing 20 is configured in accordance with the present disclosure to shield these rearwardly extension tails 22T, 24T from engagement with a tip 18T of a fuel-dispensing pump nozzle 18 as pump nozzle 18 is moved into and through nozzle-insertion housing 20 during tank refueling activities.

Nozzle-insertion housing 20 is sized to extend into fuel filler pipe 14 as shown in FIG. 3. Nozzle-insertion housing 20 is formed to include an outer nozzle-receiving aperture 20OA opening into an outer chamber 20I communicating with a fuel-conducting passageway 15 formed in fuel filler pipe 14 via an inner chamber 20I2 as suggested in FIG. 3A.

Figure 6:
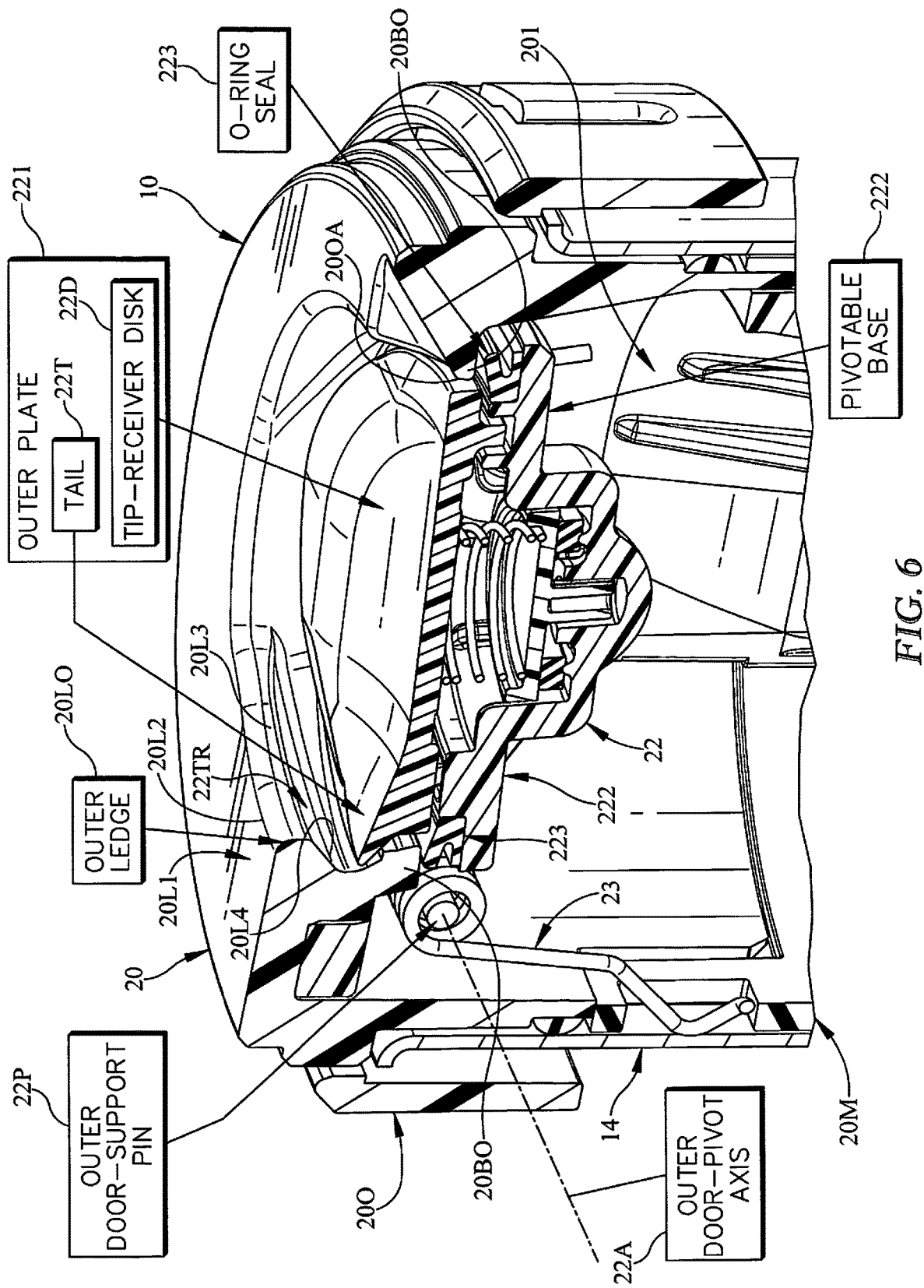
FIG. 6 is a sectional view taken along line 6-6 of FIG. 4 showing that the pivotable outer flapper door comprises a pivotable base supported on an outer door-support pin for pivotable movement about an outer door-pivot axis as suggested, for example, in FIGS. 11-16, an O-ring seal mounted on a top side of the pivotable base and arranged to engage a downwardly extending annular rim included in the outer section of the nozzle-insertion housing to establish a sealed connection between the outer flapper door and the nozzle-insertion housing when the outer flapper door is pivoted to assume the closed position, and an outer plate including (1) a tip-receiver disk arranged to engage the tip of the moving fuel-dispensing pump nozzle during insertion of the pump nozzle into the outer chamber as suggested in FIGS. 11-16 and showing that the tip-receiver disk is mated with the top side of the pivotable base to trap the O-ring seal therebetween and (2) a rearwardly extending tail coupled to a rear segment of the tip-receiver disk and arranged to extend into a tail-receiving slot formed in the outer section of the nozzle-insertion housing to lie under a radially inwardly projecting outer ledge included in the outer section.
Figure 6A:
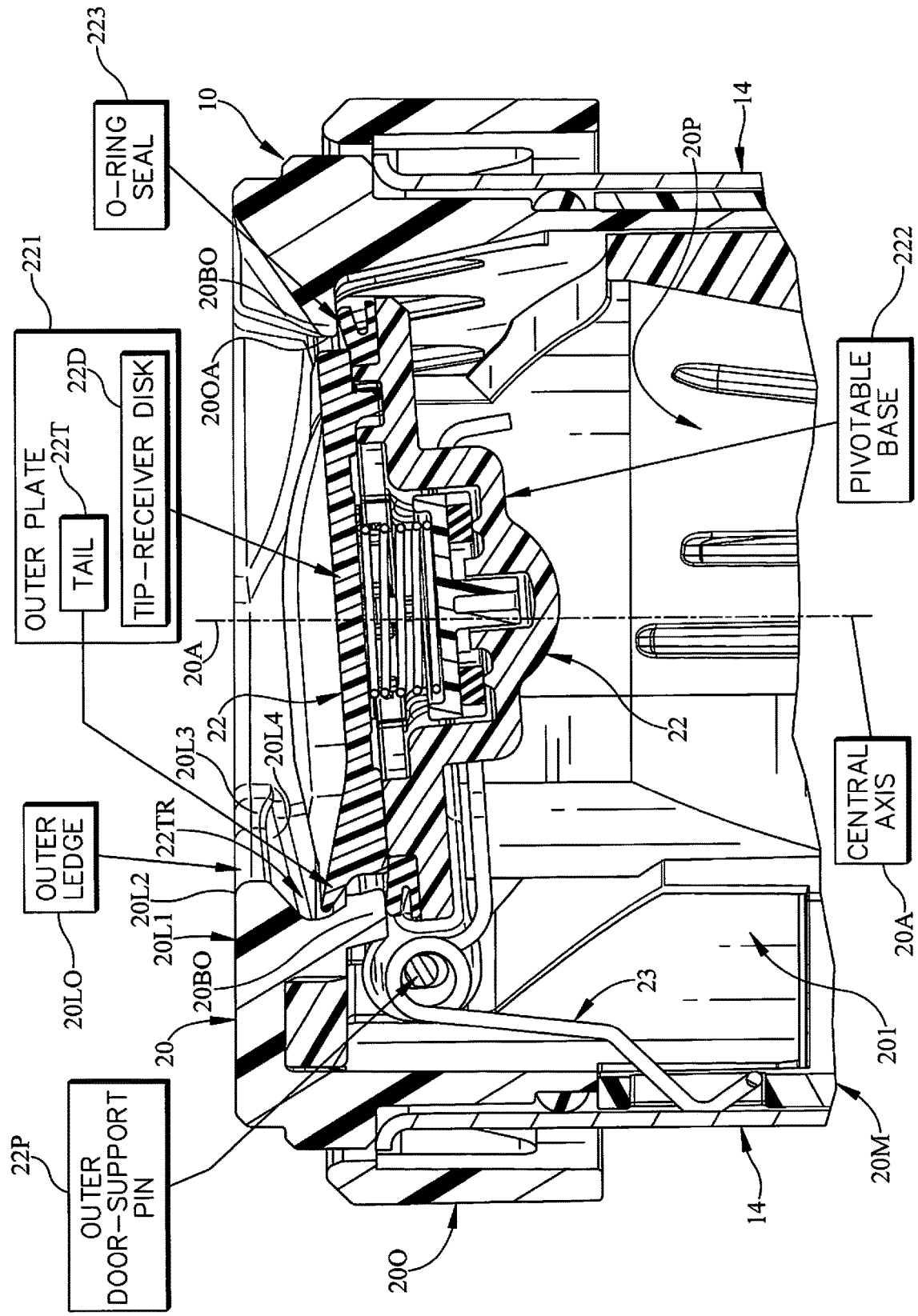
FIG. 6A is a side elevation view of the section illustrated in perspective in FIG. 6 showing that the rearwardly extending tail of the outer flapper door extends in a rearward direction away from the central axis of the nozzle-insertion housing into a tail receiver located under the radially inwardly projecting outer ledge included in the outer section of the nozzle-insertion housing.
Figure 10A:
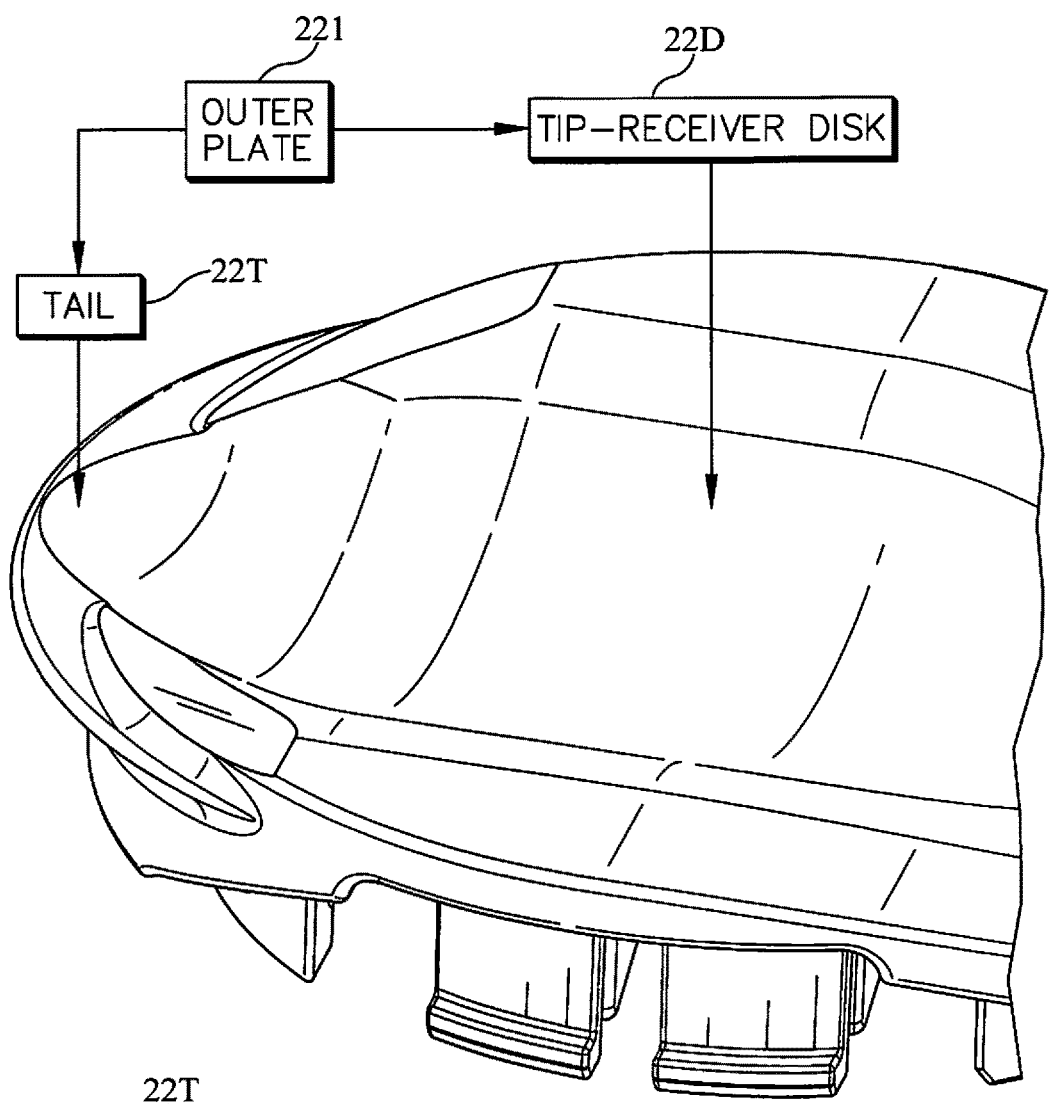
FIG. 10A is an enlarged perspective view of a portion of the outer plate that is included in the pivotable outer flapper door of FIG. 6 and showing that the rearwardly extending tail is coupled to a rear segment of the tip-receiver disk.
Figure 10B:
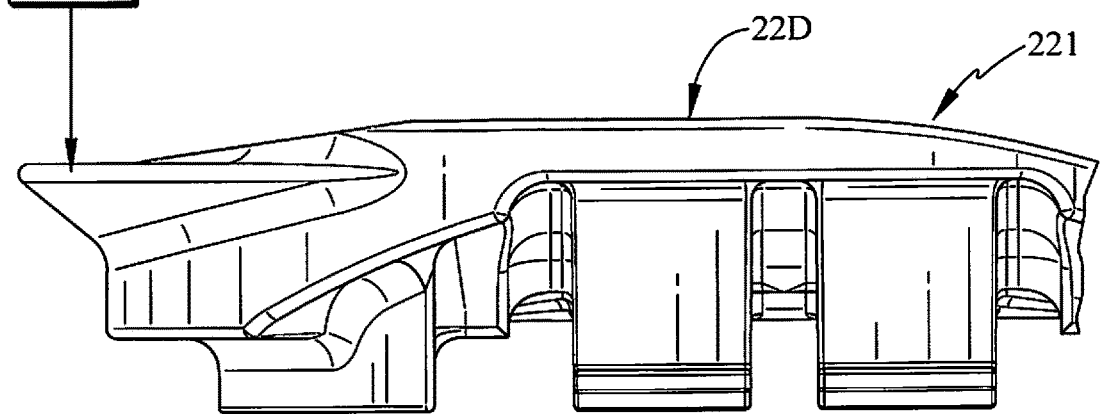
FIG. 10B is a side elevation of the outer plate of FIG. 10A showing the shape of an outer peripheral portion of the rearwardly extending tail.

Nozzle-insertion housing 20 includes an outer annular interior border 20BO formed (1) to extend around a central axis 20A of nozzle-insertion housing 20 and (2) to define the outer nozzle-receiving aperture 20OA as suggested in FIG. 6A. Nozzle-insertion housing 20 also includes an outer door-support pin 22P arranged to lie in a stationary position in outer chamber 20I and a radially inwardly extending outer ledge 20LO arranged to extend toward central axis 20A of nozzle-insertion housing 20 and lie above outer annular interior border 20BO. A portion of outer annular interior border 20BO is located in close proximity to outer door-support pin 22P.

Figure 11:
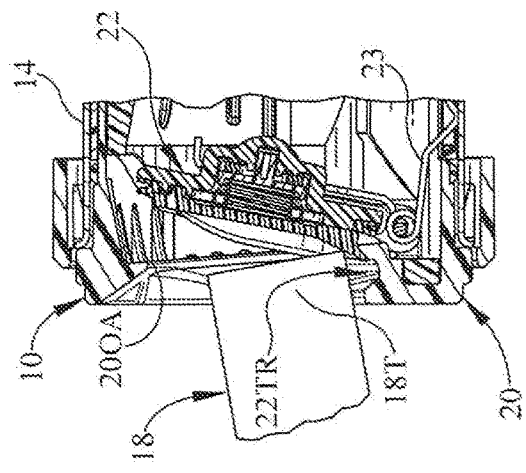
FIGS. 11-16 show a sequence in which a tip of a fuel-dispensing nozzle is pushed by a user against an exterior surface of the tip-receiver disk without catching on the hidden and shielded tail of the outer plate during insertion of the tip into an outer chamber formed in the nozzle-insertion housing.
Figure 14:
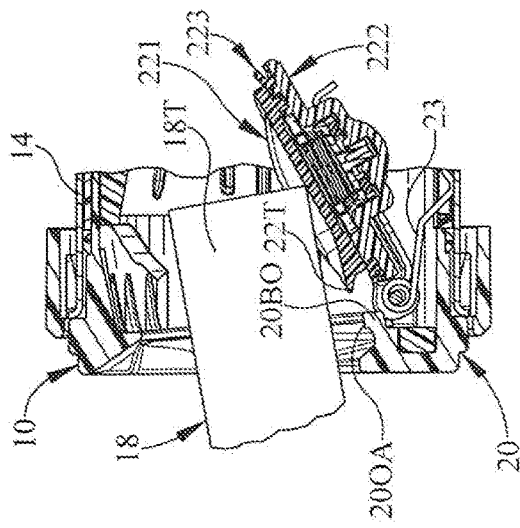
Figure 12:
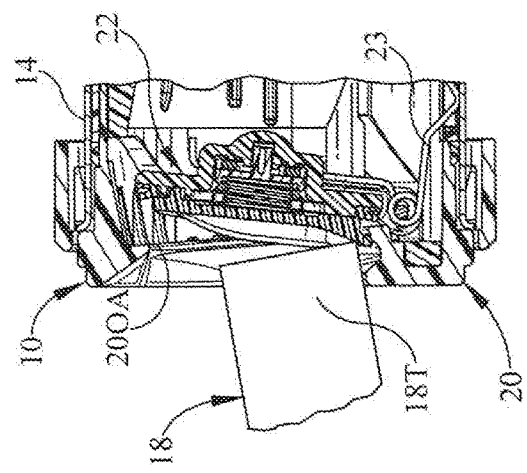
Figure 16:
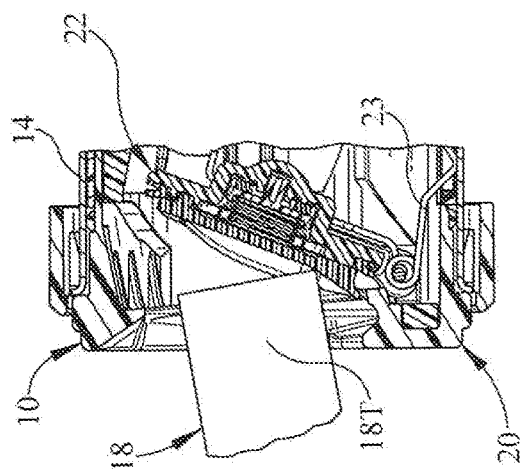

Outer flapper door 22 is mounted on outer door-support pin 22P of nozzle-insertion housing 20 for pivotable movement about an outer door-pivot axis 22A relative to nozzle-insertion housing 20 between a closed position closing the outer nozzle-receiving aperture 20OA defined by outer annular interior border 20BO as shown in FIGS. 6, 6A, and 11 and an opened position opening the outer nozzle-receiving aperture 20OA defined by the outer annular interior border 20BO as shown in FIG. 16. Outer flapper door 22 includes a rearwardly extending tail 22T that is arranged to extend away from central axis 20A of nozzle-insertion housing 20 when outer flapper door 22 occupies 20BO closed position as shown in FIG. 6.

Figure 5A:
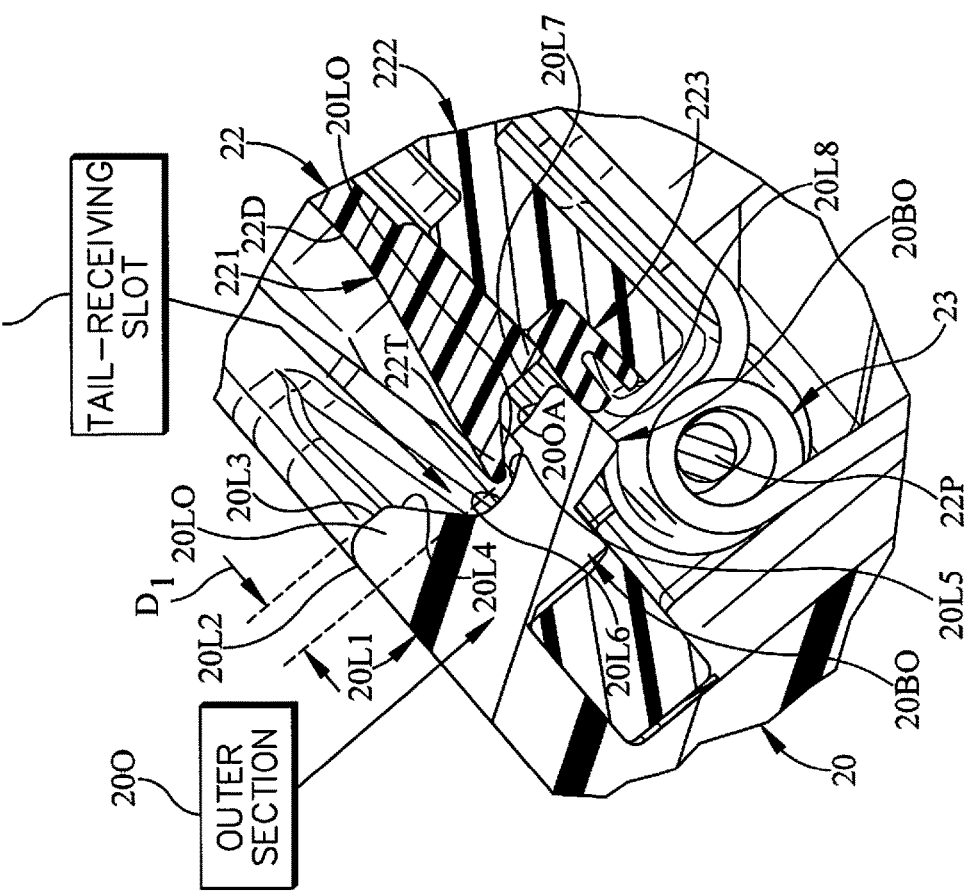
FIG. 5A is an enlarged view of a first circled region in FIG. 5 showing that the tail of the pivotable outer flapper door extends a distance $D_1$ into the tail-receiving slot formed in the outer section of the nozzle-insertion housing so that a top surface of the tail faces upwardly toward an underside of the radially inwardly projecting outer ledge included in the outer section.

The radially inwardly extending outer ledge 20LO and the outer annular interior border 20BO cooperate to define tail-receiver means 22TR for receiving rearwardly extending tail 22T of outer flapper door 22 in a hidden and shielded position under the radially inwardly extending outer ledge 20LO when outer flapper door 22 occupies the closed position as shown in FIGS. 5A and 6. The tail 22T is received in the tail-receiver means 22TR so that rearwardly extending tail 22T of outer flapper door 22 is not exposed to engagement with a tip 18T of a moving fuel-dispensing pump nozzle 18 as pump nozzle 18 moves inwardly through a portion of an outer tip-entry channel 18C (see FIGS. 7-9) bounded by the radially inwardly extending outer ledge 20LO to engage outer flapper door 22 and pivot outer flapper door 22 on outer door-support pin 22P from the closed position to the opened position during insertion of tip 18T of pump nozzle 18 through the outer nozzle-receiving aperture 20OA defined by outer annular interior border 20BO into outer chamber 20I of nozzle-insertion housing 20.

In illustrative embodiments, the tail-receiver means 22TR is an arcuate slot that opens radially inwardly toward central axis 20A of nozzle-insertion housing 20 and into outer tip-receiving channel 18C to locate outer interior annular border 20BO between arcuate slot 22TR and outer door-support pin 20P as suggested in FIG. 6A. Arcuate slot 22TR extends along an arc Θ that subtends an angle of about 110 degrees as suggested in FIG. 7.

Figure 15:
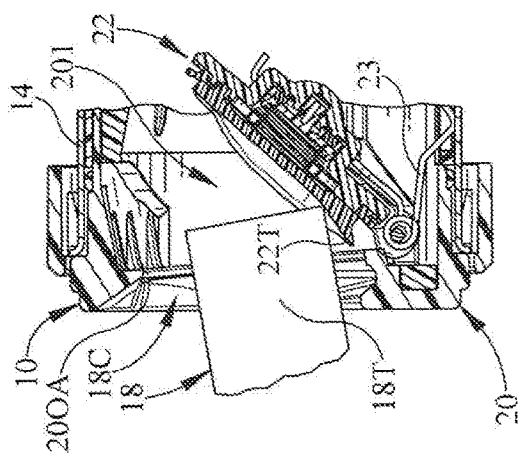
Figure 13:
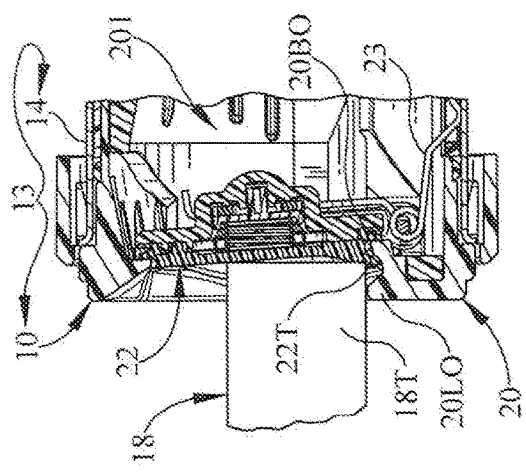

Outer flapper door 22 includes an outer plate 221 comprising rearwardly extending tail 22T and a tip-receiver disk 22D coupled to a proximal end of rearwardly extending tail 22T as shown in FIGS. 6 and 6A. Tip-receiver disk 22D is arranged to lie in an exposed position located in a portion of the outer tip-entry channel 18C bounded by outer annular interior border 20BO of nozzle-insertion housing 20 to locate a distal end of rearwardly extending tail 22T in arcuate slot 20TR when outer flapper door 22 is in the closed position. Outer nozzle-receiving aperture 22OA is situated to interconnect outer tip-entry channel 18C and outer chamber 201 formed in nozzle-insertion housing 20 in fluid communication when outer flapper door 22 is in the opened position as suggested in FIG. 15.

Outer flapper door 22 further includes a pivotable base 222 supported on outer door-support pin 22P of nozzle-insertion housing 20 for pivotable movement about an outer door-pivot axis 22A in outer chamber 201 as suggested in FIGS. 6 and 6A. The pivotable base 222 is coupled to an underside of tip-receiver disk 22D to support outer plate 221 for pivotable movement therewith relative to nozzle-insertion housing 20 and also to position distal end of rearwardly extending tail 22T to lie in spaced-apart relation to door-support pin 22P to locate a portion of outer annular interior border 22BO therebetween when outer flapper door 22 is in the closed position.

Outer flapper door 22 further includes an O-ring seal 223 mounted on a top side of the pivotable base 222 to trap a proximal portion of O-ring seal 223 between top side of pivotable base 222 and an underside of tip-receiver disk 22D as shown, for example, in FIG. 6A. Such a trapped position causes a distal portion of O-ring seal 223 to engage an underside of outer annular interior border 20BO of nozzle-insertion housing 20 when outer flapper door 22 is in the closed position and locates distal portion of O-ring seal 223 between the rearwardly extending tail 22T of outer flapper door 22 and outer door-support pin 22P.

Nozzle-insertion housing 20 includes an outer section 20O including the radially inwardly extending outer ledge 20LO, a middle section 20M including outer door-support pin 22P, and an inner section 20I as suggested in FIG. 3A. Inner Section 20I section is arranged to lie in axially spaced-apart relation to outer section 20O to locate middle section 20M between inner and outer sections 20I, 20O.

The radially inwardly extending outer ledge 20LO of nozzle-insertion housing 20 includes a radially inwardly extending, axially outwardly facing top wall 20L1 having a curved inner perimeter edge 20L2, an axially inwardly extending, radially inwardly facing curved side wall 20L3 depending from the curved inner perimeter edge 20L2 and surrounding central axis 20A of nozzle-insertion housing 20, and a radially outwardly extending, axially inwardly facing tail-covering ceiling 20L4 as suggested in FIGS. 5A, 6A, and 8. Tail-covering ceiling 20L4 is arranged to provide an upper boundary of the tail-receiver means 22TR and to overlie a distal portion of rearwardly extending tail 22T when outer flapper door 20 occupies the closed position. Outer annular interior border 20BO is coupled to the radially inwardly extending outer ledge 20LO and configured to include a radially inwardly extending, axially outwardly facing tail-underlying floor 20L5 as suggested in FIG. 5A.

Tail-underlying floor 20L5 is arranged to underlie and lie in axially inwardly spaced-apart relation to the radially outwardly extending, axially inwardly facing tail-covering ceiling 20L4 to provide a lower boundary of the tail-receiver means 22TR as suggested in FIG. 8 and underlie a distal portion of rearwardly extending tail 22T when outer flapper door 22 occupies the closed position as suggested in FIG. 5A.

Outer annular interior border 20BO further includes an axially inwardly extending, radially inwardly facing back wall 20L6 arranged to interconnect tail-covering ceiling 20L4 and tail-underlying floor 20L5 to provide a back boundary of the tail-receiver means 22TR as suggested in FIGS. 5A and 8. As suggested in FIG. 8, outer annular interior border 20BO further includes a lower section (L) comprising an axially inwardly extending, radially inwardly facing side wall 20L7 arranged to define outer nozzle-receiving aperture 20OA and an upper section (U) interconnecting outer ledge 20LO and lower section (L) and comprising back wall 20L6 and tail-underlying floor 20L5. The lower section of outer annular interior border 20BO further includes a radially outwardly extending, axially inwardly facing bottom wall 20L8 as suggested in FIG. 8.

Outer flapper door 22 further includes an O-ring seal 223 that is arranged to engage bottom wall 20L8 of lower section (L) when outer flapper door 22 occupies the closed position as suggested in FIG. 5A. A portion of O-ring seal 223 is arranged to lie between rearwardly extending tail 22T of outer flapper door 22 and outer door-support pin 22P of nozzle-insertion housing 20 when outer flapper door 22 occupies the closed position.

The axially inwardly extending, radially inwardly facing curved side wall 20L3 is circular and surrounds a vertical axis 20TRA as suggested in FIG. 7. Arcuate slot 22TR extends along an arc subtended by an angle Θ of about 110 degrees where the vertex (v) of the angle Θ is located at a point on vertical axis 20TRA. Arcuate slot 22TR is arranged to lie in axially spaced-apart relation to outer door-pivot axis 20P in a location outside of outer chamber 201 formed in nozzle-insertion housing 20.

Arcuate slot 22TR opens radially inwardly toward central axis 20A of nozzle-insertion housing 20 as suggested in FIG. 6A. Outer ledge 20LO includes a downwardly facing surface arcuate surface 20L4 as suggested in FIG. 8. Outer annular interior border 20BO includes an upwardly facing arcuate surface 20L5. The upwardly facing arcuate surface 20L5 is arranged to lie in spaced-apart confronting relation to the downwardly facing arcuate surface 20L4 to define arcuate slot 22TR therebetween. This arrangement causes a portion of the rearwardly extending tail 22T of outer flapper door 22 to lie between the downwardly and upwardly facing arcuate surfaces 20L4, 20L5 when outer flapper door 22 occupies the closed position. The downwardly facing arcuate surface has a frusto-conical shape in an illustrative embodiment of the present disclosure.

A portion of the downwardly facing arcuate surface 20L4 has a positively sloping orientation and a portion of the upwardly facing arcuate surface 20L5 has a negatively sloping orientation as suggested in FIG. 5A. Outer annular interior border 20BO also includes a vertically extending radially inwardly facing arcuate surface 20L6 interconnecting perimeter edges of the downwardly and upwardly facing arcuate surfaces 20L4, 20L5.

Nozzle-insertion housing 20 is also formed to include an inner nozzle-receiving aperture 20IA communicating with outer chamber 201 and opening into an inner chamber 202 communicating with the fuel-conducting passageway 15 formed in fuel filler pipe 14 to allow a fuel-dispensing pump nozzle 18 to extend through each of the outer and inner nozzle-receiving apertures 20OA, 20IA in sequence to dispense fuel into inner chamber 202 for delivery to a fuel tank 14 via the fuel-conducting passageway 15 formed in fuel filler pipe 14. Nozzle-insertion housing 20 further includes an inner annular interior border 20BI located below outer annular interior border 20BO and formed (1) to extend around central axis 20A of nozzle-insertion housing 20 and (2) to define the inner nozzle-receiving aperture 20IA. An inner door-support pin 24P is arranged to lie in a stationary position in inner chamber 202. Nozzle-insertion housing 20 further includes a radially inwardly extending inner ledge 20LI arranged to extend toward central axis 20A of nozzle-insertion housing 20 and lie above inner annular interior border 20BI.

Figure 17:
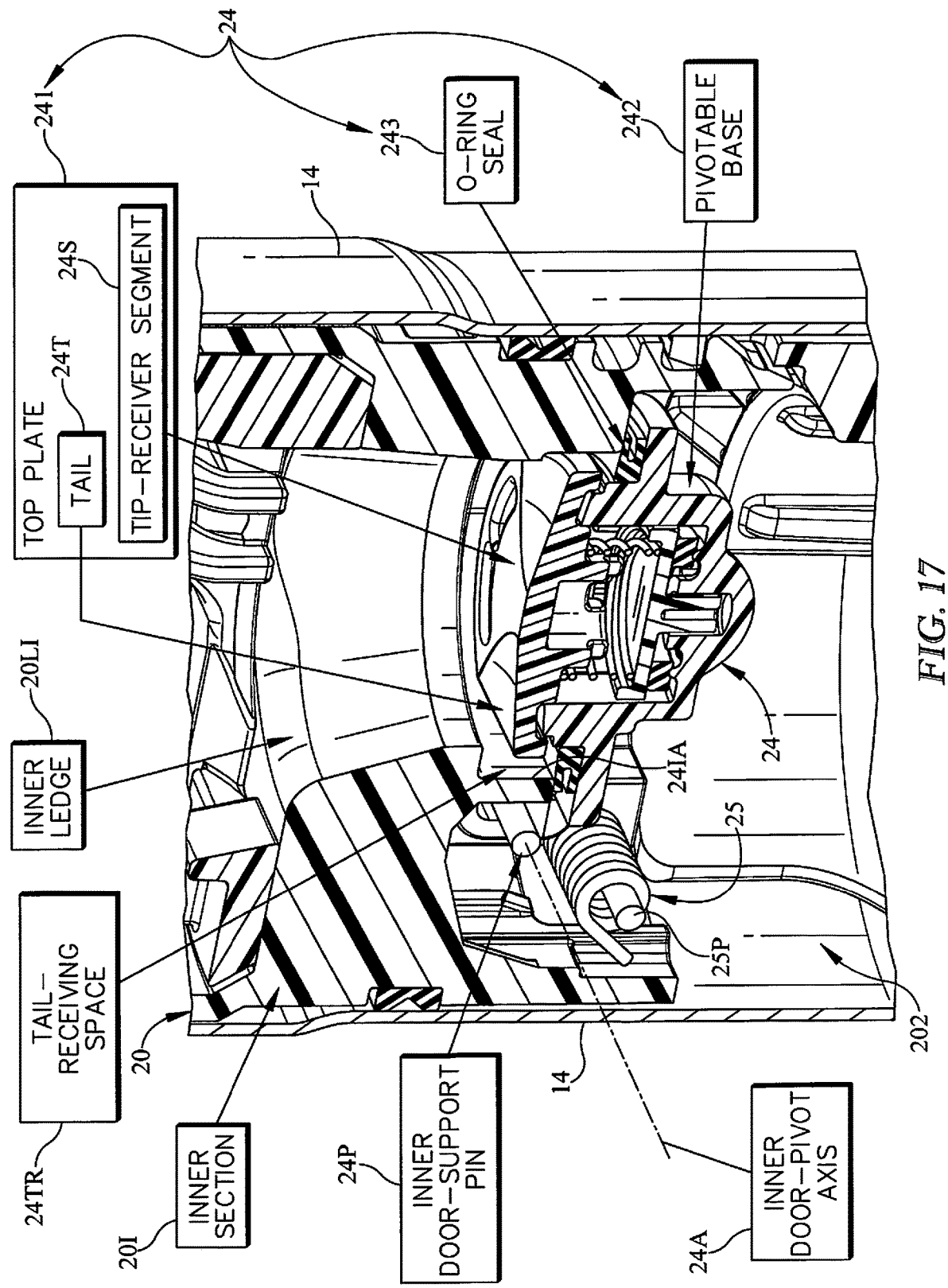
FIG. 17 is a sectional view taken along line 17-17 of FIG. 4 showing that the pivotable inner flapper door comprises a pivotable base supported on an inner door-support pin for pivotable movement about an inner door-pivot axis, an O-ring seal mounted on a top side of the pivotable base and arranged to engage a downwardly extending annular rim included in the inner section of the nozzle-insertion housing to establish a sealed connection between the inner flapper door and the nozzle-insertion housing when the inner flapper door is pivoted to assume the closed position, and a top plate including a tip-receiver segment arranged to engage the tip of the fuel-dispensing pump nozzle during insertion of the pump nozzle into the inner chamber and suggesting that the tip-receiver segment is mated with the top side of the pivotable base to trap the O-ring seal therebetween when the inner flapper valve occupies an opened position and a rearwardly extending tail is coupled to a rear portion of the tip-receiver segment and arranged to extend into a tail-receiving space formed in the inner section of the nozzle-insertion housing to lie under a radially inwardly projection inner ledge included in the inner section, and showing that an inner door-closing spring is mounted on a spring-support pin that is separated from the inner door-support pin and arranged normally to yieldably urge the pivotable inner flapper door to the closed position.
Figure 17A:
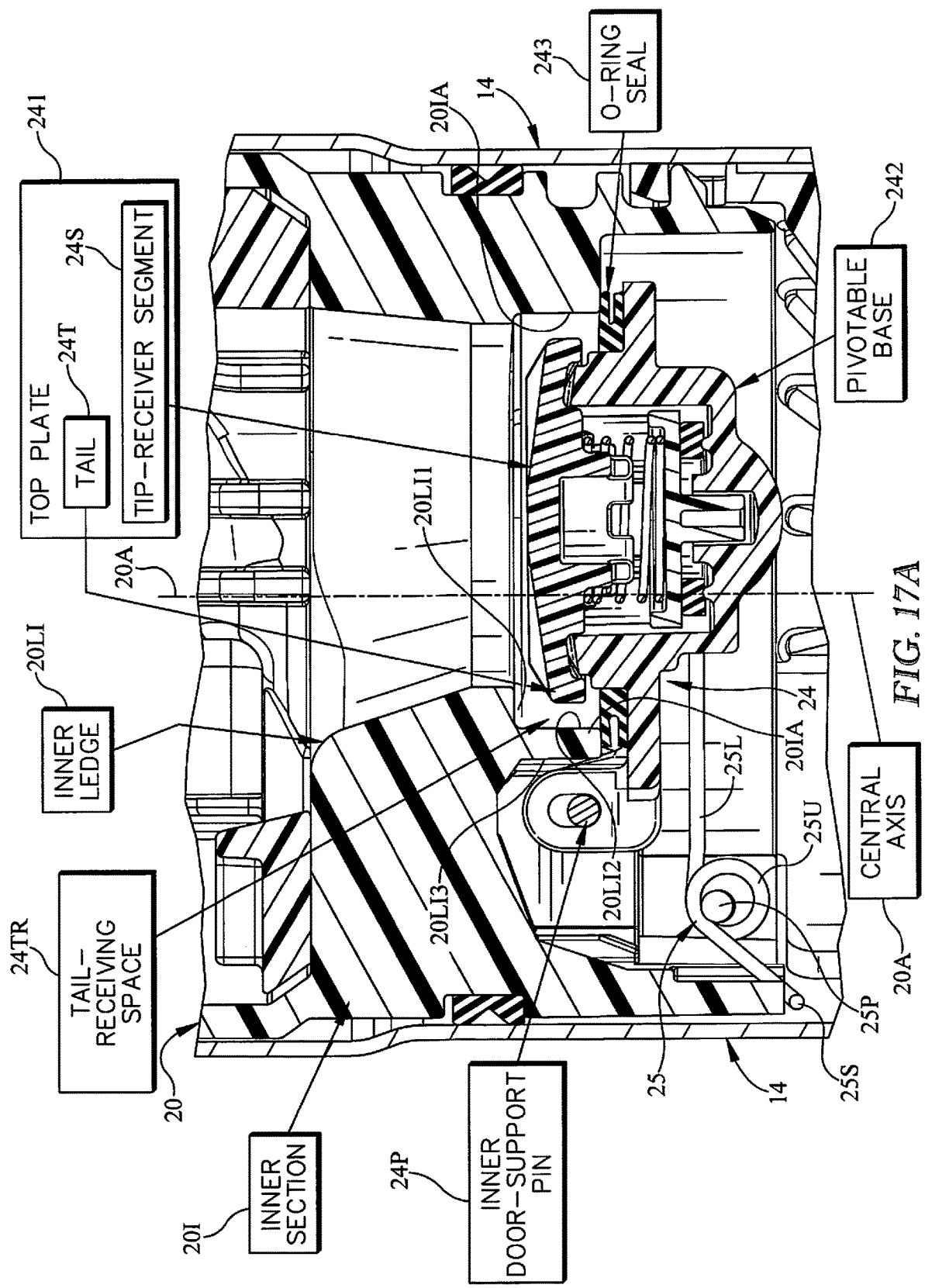
FIG. 17A is a side elevation view of the section illustrated in perspective in FIG. 17 showing that the rearwardly extending tail of the inner flapper door extends in a rearward direction away from the central axis of the nozzle-insertion housing into a tail-receiving space located under the radially inwardly projecting inner ledge included in the inner section of the nozzle-insertion housing.
Figure 18:
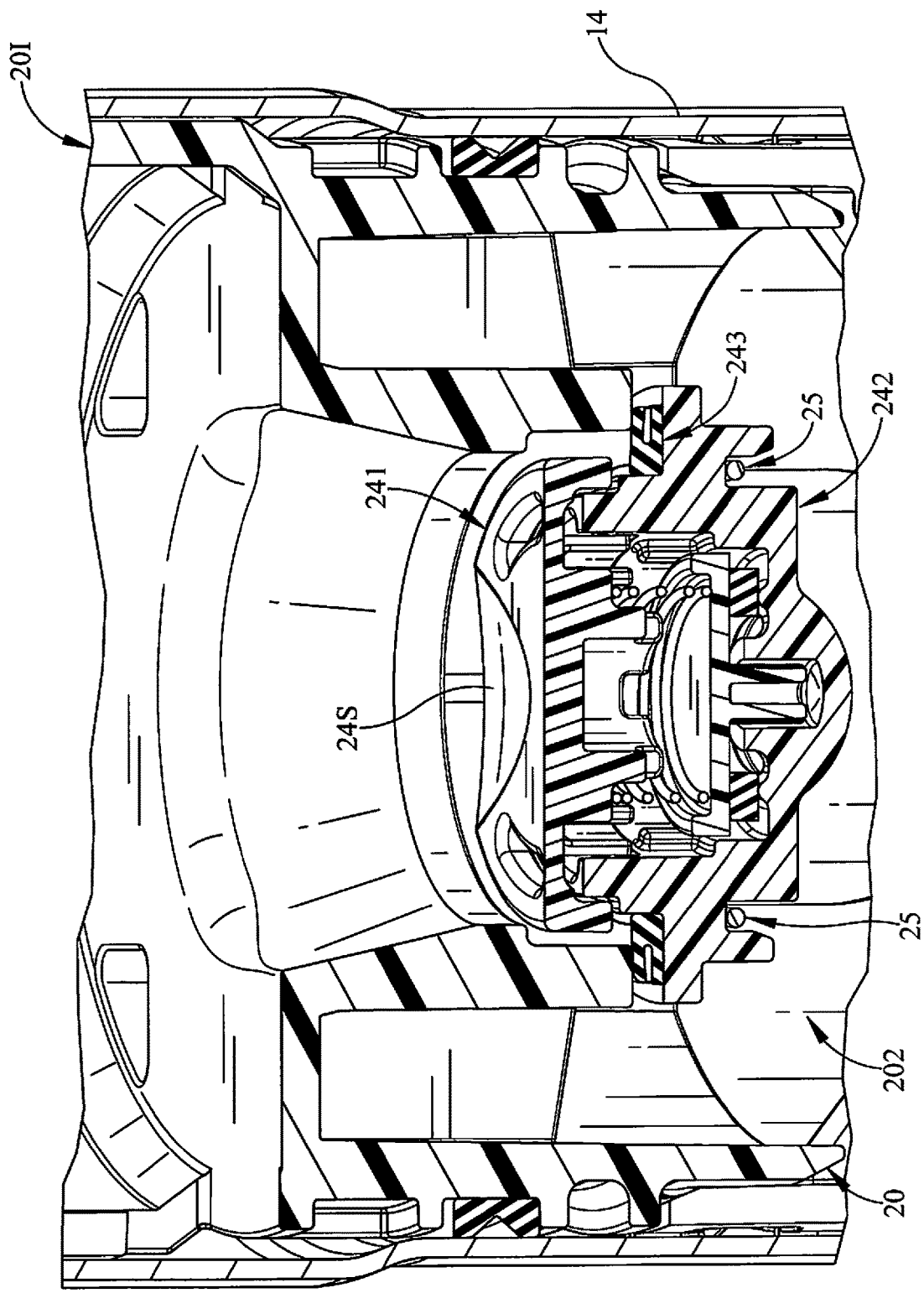
FIG. 18 is a sectional view taken along line 18-18 of FIG. 17 showing placement of the rearwardly extending tail of the pivotable inner flapper door in the tail-receiving space formed in the inner section of the nozzle-insertion housing.

Filler pipe closure 10 further comprises an inner flapper door 24 mounted on inner door-support pin 24P of nozzle-insertion housing 20 as shown in FIGS. 3A, 17, and 17A for pivotable movement about an inner door-pivot axis 24A relative to nozzle-insertion housing 20 between a closed position closing the inner nozzle-receiving aperture 20IA defined by inner annular interior border 20BI and an opened position opening the inner nozzle-receiving aperture 20IA defined by inner annular interior border 20BI.

Inner flapper door 24 includes a rearwardly extending tail 24T that is arranged to extend away from central axis 20A of nozzle-insertion housing 20 when inner flapper door 24 occupies the closed position as shown in FIG. 17A. A portion of inner annular interior border 20BI is located in close proximity to inner door-support pin 24P.

The radially inwardly extending inner ledge 20LI and the inner annular interior border 20BI cooperate to define inner tail-receiver means 24TR for receiving the rearwardly extending tail 24T of inner flapper door 24 as shown in FIG. 17A in a hidden and shielded position under the radially inwardly extending inner ledge 20LI when inner flapper door 24 occupies the closed position so that rearwardly extending tail 24T of inner flapper door 24 is not exposed to engagement with a tip 18T of a moving fuel-dispensing pump nozzle 18 as pump nozzle 18 moves inwardly through outer chamber 201 and past the radially inwardly extending inner ledge 20LI to engage inner flapper door 24 and pivot inner flapper door 24 on inner door-support pin 24P from the closed position to the opened position during insertion of tip 18T of pump nozzle 18 through the inner nozzle-receiving aperture 20IA defined by inner annular interior border 20BI into inner chamber 202 of nozzle-insertion housing 20.

The radially inwardly extending inner ledge 20LI includes a radially outwardly extending, axially inwardly facing bottom wall 20LI1 that cooperates with an adjacent axially inwardly extending, radially inwardly facing inner side wall 20LI2 of inner annular interior border 20BI to define a boundary of the inner tail-receiver means 24TR as shown in FIG. 17A. The inner annular interior border 20BI further includes an axially inwardly extending, radially outwardly facing outer side wall 20LI3 located between inner door-support pin 24P and the axially inwardly extending, radially outwardly facing inner side wall 20LI2 of inner annular interior border 20BI.

Inner flapper door 24 includes a top plate 241 comprising the radially extending tail 24T of inner flapper door 24 and a tip-receiver segment 24S as suggested in FIG. 17. Tip-receiver segment 24S is coupled to a proximal end of rearwardly extending tail 24T of inner flapper door 24 and arranged to lie in an exposed position located in a nozzle-receiving channel bounded by the axially inwardly extending, radially inwardly facing inner side wall 20LI2 of inner annular interior border 20BI to locate a distal end of rearwardly extending tail 24T of inner flapper door 24 in the inner tail-receiver means 24TR when inner flapper door 24 is in the closed position. The nozzle-receiving channel is situated to interconnect outer and inner chambers 201, 202 in fluid communication when inner flapper door 24 is in the opened position.

Inner flapper door 24 further includes a pivotable base 242 shown in FIG. 17A and supported on inner door-support pin 24P of nozzle-insertion housing 20 for pivotable movement about an inner door-pivot axis 24A in inner chamber 202. Inner flapper door 24 also includes an O-ring seal 243 shown in FIG. 17A and mounted on a top side of the pivotable base 242 of inner flapper door 24 and arranged to engage an underside of inner annular interior border 20BI when inner flapper door 24 occupies a closed position to locate rearwardly extending tail 24T of inner flapper door 24 between a portion of O-ring seal 243 of inner flapper door 24 and the radially outwardly extending, axially inwardly facing bottom wall of the radially inwardly extending inner ledge 20LI.

The spring-loaded nozzle-actuated outer flapper door 22 is located in an outer end of nozzle-insertion housing 20 and yieldably biased to assume a closed position closing an outer nozzle-receiving aperture 20OA formed in nozzle-insertion housing 20 as shown in FIG. 3A. The spring-loaded inner flapper door 24 is yieldably biased to assume a closed position closing an inner nozzle-receiving aperture 20IA formed in a middle section 20M of nozzle-insertion housing 20 and arranged to lie in spaced-apart relation to outer flapper door 22 to define an outer chamber 201 of nozzle-insertion housing 20 as shown in FIG. 3A. An overflow-capture-and-drainage system 30 is configured in accordance with the present disclosure to conduct any conduct liquid fuel extant above a closed inner flapper door 24 through an inner chamber 202 formed in nozzle-insertion housing 20 into a fuel-conducting passageway 15 formed in fuel filler pipe 14 for delivery to fuel tank 16.

An outer section 20O of nozzle-insertion housing 20 is formed to include a center portion 203, a rim portion 204 arranged to surround center portion 203 to trap an outer end of fuel filler pipe 14 therebetween, and a series of frangible circumferentially spaced-apart break-away segments (F) coupled at one end to center portion 203 and at another end to rim portion 204 as suggested in FIGS. 2, 3A, 3B. A laser weld (W) is used to join center portion 203 of the outer section 20O of nozzle-insertion housing 20 to an upper cylindrical sleeve 20IS of an inner section 20I of the nozzle-insertion housing 20 that is used to support the pivotable inner flapper door 24.

A spring-support pin 25 used to support a torsion spring 25 associated with inner flapper door 24 is decoupled from door-pivot axis 24A of the pivotable inner flapper door 24. Such decoupling locates the door-pivot axis 24A of the pivotable inner flapper door 24 between the door-pivot axis 22A of the pivotable outer flapper door 22 and the spring-support pin 25P associated with the inner flapper door 24.

An exploded assembly view of the component shown in FIG. 3A is provided in FIG. 3B to suggest that outer and middle sections 20O, 20M of the nozzle-insertion housing 20 cooperate with a spring-loaded outer flapper door 22 to form an outer module M1 of filler pipe closure 10. An inner section 20I of nozzle-insertion housing 20 cooperates with a spring-loaded inner flapper door 24 to form an inner module M2 of filler pipe closure 10 as suggested in FIG. 3B.

An overflow-capture-and-drainage system 30 of filler pipe closure 10 is arranged to lie under the inner and outer modules M2, M1 when the components are assembled as shown in FIG. 3A. The liquid-fuel overflow-capture-and-drainage system 30 is arranged and configured to manage collection and drainage of any overflow liquid fuel that is able to flow outwardly to a region in the inner chamber 202 located above a pump-discharge-shut-off (aperture opening) aperture formed in the fuel-dispensing pump nozzle 18. During insertion of a fuel-dispensing pump nozzle 18 into the capless system 10 to open the spring-biased outer and inner flapper doors 22, 24, any overflow liquid fuel extant in inner chamber 202 above the aspirator opening in the fuel-dispensing pump nozzle 18 will fall under gravity into deep overflow reservoirs 302 formed in the overflow-capture-and-drainage system 30 located inside the fuel-tank filler pipe 14 and then exit those overflow reservoirs 302 through bottom reservoir-drain holes 304 to flow downwardly into the fuel-conducting passageway 15 that leads to the fuel tank 16. The overflow-capture-and-drainage system 30 is formed to include ten top-opening deep overflow reservoirs 302 in an illustrative embodiment. Each overflow reservoir 302 is bounded, in part, by a bottom wall 302W formed to include a reservoir-drain hole 304 that opens into the fuel filler pipe 14.

An underside of the spring-biased inner flapper door 24 is illustrated in FIG. 4 to reveal that the door-closing spring 25 associated with the pivotable inner flapper door 24 includes a helically wound energy-storage unit 25U comprising sixteen coils 25C mounted on a spring-support pin 25P, a relatively short first leg 25S coupled to a middle portion of the helically wound energy-storage unit 25U and arranged to engage the nozzle-insertion housing 20, and a pair of relatively longer second legs 20L coupled to outer portions of the helically wound energy-storage unit 25U and arranged to engage the inner flapper door 24 to apply a door-closing force to the inner flapper door 24. The spring-biased outer flapper door 22 is illustrated in FIG. 6 to reveal that the door-closing spring 23 associated with the pivotable outer flapper door 22 includes a helically wound energy-storage unit 23U comprising twelve coils 23C mounted on a door-support pin 22P for the pivotable outer flapper door 22.

An enlarged sectional view of the inner flapper door 24 is provided in FIG. 5 to illustrate that inner flapper door 24 includes a spring-loaded pressure-relief valve 240 comprising a downwardly facing overmolded sealing ring 241 carried on a ring-support disk 242, a downwardly extending valve stem 242 coupled to an underside of ring-support disk 242, and a snap-on, spring-support base 244 above ring-support disk 242. The snap-on, spring-support base 244 is configured to snap onto an upwardly extending base-mount ring 245 included in inner flapper door 24. A coiled compression spring 246 acts between base 244 and disk 242 to yieldably urge sealing ring to engage a valve seat 247.

An enlarged sectional view of the outer flapper door 22 is provided in FIG. 7 to illustrate that outer flapper door 22 includes a spring-loaded pressure-relief valve 220 comprising a downwardly facing overmolded sealing ring 221 carried on a ring-support disk 222, a downwardly extending valve stem 223 coupled to an underside of ring-support disk 222, and a snap-on spring-support base 224 above the ring-support disk 222. The snap-on, spring-support base 224 is configured to snap onto an upwardly extending base-mount ring 225 included in the outer flapper door 22. A coiled compression spring 226 acts between base 224 and disk 222 to yieldably urge sealing ring 221 to engage a valve seat 227.

The invention claimed is:

1. A filler pipe closure for a fuel filler pipe associated with a vehicle fuel tank, the filler pipe closure comprising
a nozzle-insertion housing sized to extend into the fuel filler pipe and formed to include an outer nozzle-receiving aperture opening into an outer chamber communicating with a fuel-conducting passageway formed in the fuel filler pipe, the nozzle-insertion housing including an outer annular interior border formed to extend around a central axis of the nozzle-insertion housing and to define the outer nozzle-receiving aperture, an outer door-support pin arranged to lie in a stationary position in the outer chamber, and a radially inwardly extending outer ledge arranged to extend toward the central axis of the sleeve and lie above the outer annular interior border,
an outer flapper door mounted on the outer door-support pin of the nozzle-insertion housing for pivotable movement about an outer door-pivot axis relative to the nozzle-insertion housing between a closed position closing the outer nozzle-receiving aperture defined by the outer annular interior border and an opened position opening the outer nozzle-receiving aperture defined by the outer annular interior border,
wherein the outer flapper door includes a rearwardly extending tail that is arranged to extend away from the central axis of the nozzle-insertion housing when the outer flapper door occupies the closed position, a portion of the outer annular interior border is located in close proximity to the outer door-support pin, and the radially inwardly extending outer ledge and the outer annular interior border cooperate to define tail-receiver means for receiving the rearwardly extending tail of the outer flapper door in a hidden position under the radially inwardly extending outer ledge when the outer flapper door occupies the closed position so that the rearwardly extending tail of the outer flapper door is not exposed to a tip of a moving fuel-dispensing pump nozzle as the pump nozzle moves inwardly through a portion of an outer tip-entry channel bounded by the radially inwardly extending outer ledge to engage the outer flapper door and pivot the outer flapper door on the outer door-support pin from the closed position to the opened position during insertion of the tip of the pump nozzle through the outer nozzle-receiving aperture defined by the outer annular interior border into the outer chamber of the nozzle-insertion housing.

2. The filler pipe closure of claim 1, wherein the nozzle-insertion housing is also formed to include an inner nozzle-receiving aperture communicating with the outer chamber and opening into an inner chamber communicating with the fuel-conducting passageway formed in the fuel filler pipe to allow a fuel-dispensing pump nozzle to extend through each of the outer and inner nozzle-receiving apertures in sequence to dispense fuel into the inner chamber for delivery to a fuel tank via the fuel-conducting passageway formed in the fuel filler pipe, and wherein the nozzle-insertion housing further includes an inner annular interior border located below the outer annular interior border and formed to extend around the central axis of the nozzle-insertion housing and to define the inner nozzle-receiving aperture, an inner door-support pin arranged to lie in a stationary position in the inner chamber, and a radially inwardly extending inner ledge arranged to extend toward the central axis of the nozzle-insertion housing and lie above the inner annular interior border, and wherein the filler pipe closure further comprises an inner flapper door mounted on the inner door-support pin of the nozzle-insertion housing for pivotable movement about an inner door-pivot axis relative to the nozzle-insertion housing between a closed position closing the inner nozzle-receiving aperture defined by the inner annular interior border and an opened position opening the inner nozzle-receiving aperture defined by the inner annular interior border, wherein the inner flapper door includes a rearwardly extending tail that is arranged to extend away from the central axis of the nozzle-insertion housing when the inner flapper door occupies the closed position, a portion of the inner annular interior border is located in close proximity to the inner door-support pin, and the radially inwardly extending inner ledge and the inner annular interior border cooperate to define inner tail-receiver means for receiving the rearwardly extending tail of the inner flapper door in a hidden position under the radially inwardly extending inner ledge when the inner flapper door occupies the closed position so that the rearwardly extending tail of the inner flapper door is not exposed to a tip of a moving fuel-dispensing pump nozzle as the pump nozzle moves inwardly through the outer chamber and past the radially inwardly extending inner ledge to engage the inner flapper door and pivot the inner flapper door on the inner door-support pin from the closed position to the opened position during insertion of the tip of the pump nozzle through the inner nozzle-receiving aperture defined by the inner annular interior border into the inner chamber of the nozzle-insertion housing.

3. The filler pipe closure of claim 1, wherein the tail-receiver means is an arcuate slot that opens radially inwardly toward the central axis of the nozzle-insertion housing into the outer tip-receiving channel to locate the outer interior annular border between the arcuate slot and the outer door-support pin.

4. The filler pipe of claim 3, wherein the arcuate slot extends along an arc that subtends an angle of about 110 degrees.

5. The filler pipe of claim 3, wherein the nozzle-insertion housing includes an outer section including the radially inwardly extending outer ledge, a middle section including the outer door-support pin, and an inner section arranged to lie in axially spaced-apart relation to the outer section to locate the middle section between the inner and outer sections.

6. The filler pipe closure of claim 3, wherein the outer flapper door includes an outer plate comprising the rearwardly extending tail and a tip-receiver disk coupled to a proximal end of rearwardly extending tail and arranged to lie in an exposed position located in a portion of the outer tip-entry channel bounded by the outer annular interior border of the nozzle-insertion housing to locate a distal end of the rearwardly extending tail in the arcuate slot when the outer flapper door is in the closed position and wherein the outer nozzle-receiving aperture is situated to interconnect the outer tip-entry channel and the outer chamber formed in the nozzle-insertion housing in fluid communication when the outer flapper door is in the opened position.

7. The filler pipe closure of claim 6, wherein the outer flapper door further includes a pivotable base supported on the outer door-support pin of the nozzle-insertion housing for pivotable movement about an outer door-pivot axis in the outer chamber and the pivotable base is coupled to an underside of the tip-receiver disk to support the outer plate for pivotable movement therewith relative to the nozzle-insertion housing and also to position the distal end of the rearwardly extending tail to lie in spaced-apart relation to the door-support pin to locate a portion of the outer annular interior border therebetween when the outer flapper door is in the closed position.

8. The filler pipe closure of claim 7, wherein the outer flapper door further includes an O-ring seal mounted on a top side of the pivotable base to trap a proximal portion of the O-ring seal between the top side of the pivotable base and an underside of the tip-receiver disk to cause a distal portion of the O-ring seal to engage an underside of the outer annular interior border of the nozzle-insertion housing when the outer flapper door is in the closed position and to locate the distal portion of the O-ring seal between the rearwardly extending tail of the outer flapper door and the outer door-support pin.

9. The filler pipe closure of claim 1, wherein the radially inwardly extending outer ledge of the nozzle-insertion housing includes a radially inwardly extending, axially outwardly facing top wall having a curved inner perimeter edge, an axially inwardly extending, radially inwardly facing curved side wall depending from the curved inner perimeter edge and surrounding the central axis of the nozzle-insertion housing, and a radially outwardly extending, axially inwardly facing tail-covering ceiling that is arranged to provide an upper boundary of the tail-receiver means and to overlie a distal portion of the rearwardly extending tail when the outer flapper door occupies the closed position, the outer annular interior border is coupled to the radially inwardly extending outer ledge and configured to include a radially inwardly extending, axially outwardly facing tail-underlying floor that is arranged to underlie and lie in axially inwardly spaced-apart relation to the radially outwardly extending, axially inwardly facing tail-covering ceiling to provide a lower boundary of the tail-receiver means and underlie a distal portion of the rearwardly extending tail when the outer flapper door occupies the closed position.

10. The filler pipe closure of claim 9, wherein the axially inwardly extending, radially inwardly facing curved side wall is circular and surrounds a vertical axis and the arcuate slot extends along an arc subtended by an angle of about 110 degrees where the vertex of the angle is located at a point on the vertical axis.

11. The filler pipe closure of claim 9, wherein the arcuate slot is arranged to lie in axially spaced-apart relation to the outer door-pivot axis in a location outside of the outer chamber formed in the nozzle-insertion housing.

12. The filler pipe closure of claim 9, wherein the outer annular interior border further includes an axially inwardly extending, radially inwardly facing back wall arranged to interconnect the tail-covering ceiling and the tail-underlying floor to provide a back boundary of the tail-receiver means.

13. The filler pipe closure of claim 12, wherein the outer annular interior border includes a lower section comprising an axially inwardly extending, radially inwardly facing side wall arranged to define the outer nozzle-receiving aperture and an upper section interconnecting the outer ledge and the lower section and comprising the back wall and the tail-underlying floor.

14. The filler pipe closure of claim 13, wherein the lower section of the outer annular interior border further includes a radially outwardly extending, axially inwardly facing bottom wall and the outer flapper door further includes an O-ring seal that is arranged to engage the bottom wall of the lower section when the outer flapper door occupies the closed position and a portion of the O-ring seal is arranged to lie between the rearwardly extending tail of the outer flapper door and the outer door-support pin of the nozzle-insertion housing when the outer flapper door occupies the closed position.

15. The filler pipe closure of claim 1, wherein the tail-receiver means is an arcuate slot that opens radially inwardly toward the central axis of the nozzle-insertion housing, the radially inwardly extending outer ledge includes a downwardly facing surface arcuate surface and the nozzle-insertion housing further includes an upwardly facing arcuate surface arranged to lie in spaced-apart confronting relation to the downwardly facing arcuate surface to define the arcuate slot therebetween to cause a portion of the rearwardly extending tail of the outer flapper door to lie between the downwardly and upwardly facing arcuate surfaces when the outer flapper door occupies the closed position.

16. The filler pipe closure of claim 15, wherein the downwardly facing arcuate surface has a frusto-conical shape.

17. The filler pipe closure of claim 16, wherein the upwardly facing arcuate surface has a frusto-conical shape.

18. The filler pipe closure of claim 15, wherein a portion of the downwardly facing arcuate surface has a positively sloping orientation and a portion of the upwardly facing arcuate surface has a negatively sloping orientation.

19. The filler pipe closure of claim 18, wherein the radially inwardly extending outer ledge also includes a vertically extending radially inwardly facing arcuate surface interconnecting perimeter edges of the downwardly and upwardly facing arcuate surfaces.

20. The filler pipe closure of claim 18, wherein the radially inwardly extending inner ledge includes a radially outwardly extending, axially inwardly facing bottom wall that cooperates with an adjacent axially inwardly extending, radially inwardly facing inner side wall of the inner annular interior border to define a boundary of the inner tail-receiver means.

21. The filler pipe closure of claim 20, wherein the inner annular interior border further includes an axially inwardly extending, radially outwardly facing outer side wall located between the inner door-support pin and the axially inwardly extending, radially outwardly facing inner side wall of the inner annular interior border.

22. The filler pipe closure of claim 20, wherein the inner flapper door includes a top plate comprising the radially extending tail of the inner flapper door and a tip-receiver segment coupled to a proximal end of the rearwardly extending tail of the inner flapper door and arranged to lie in an exposed position located in a nozzle-receiving channel bounded by the axially inwardly extending, radially inwardly facing inner side wall of the inner annular interior border to locate a distal end of the rearwardly extending tail of the inner flapper door in the inner tail-receiver means when the inner flapper door is in the closed position and wherein the nozzle-receiving channel is situated to interconnect the outer and inner chambers in fluid communication when the inner flapper door is in the opened position.

23. The filler pipe closure of claim 22, wherein the inner flapper door further includes a pivotable base supported on the inner door-support pin of the nozzle-insertion housing for pivotable movement about an inner door-pivot axis in the inner chamber and an O-ring seal mounted on a top side of the pivotable base of the inner flapper door and arranged to engage an underside of the inner annular interior border when the inner flapper door occupies a closed position to locate the rearwardly extending tail of the inner flapper door between a portion of the O-ring seal of the inner flapper door and the radially outwardly extending, axially inwardly facing bottom wall of the radially inwardly extending inner ledge.

24. A filler pipe closure for a fuel filler pipe associated with a vehicle fuel tank, the filler pipe closure comprising A nozzle-insertion housing sized to extend into the fuel filler pipe and formed to include an outer nozzle-receiving aperture opening into an outer chamber, wherein the nozzle-insertion housing is also formed to include an inner nozzle-receiving aperture communicating with the outer chamber and opening into an inner chamber communicating with the fuel-conducting passageway formed in the fuel filler pipe to allow a fuel-dispensing pump nozzle to extend through each of the outer and inner nozzle-receiving apertures in sequence to dispense fuel into the inner chamber for delivery to a fuel tank via the fuel-conducting passageway formed in the fuel filler pipe, and wherein the nozzle-insertion housing further includes an inner annular interior border located below the outer nozzle-receiving aperture and formed to extend around the central axis of the nozzle-insertion housing and to define the inner nozzle-receiving aperture, an inner door-support pin arranged to lie in a stationary position in the inner chamber, and a radially inwardly extending inner ledge arranged to extend toward the central axis of the nozzle-insertion housing and lie above the inner annular interior border, and an inner flapper door mounted on the inner door-support pin of the nozzle-insertion housing for pivotable movement about an inner door-pivot axis relative to the nozzle-insertion housing between a closed position closing the inner nozzle-receiving aperture defined by the inner annular interior border and an opened position opening the inner nozzle-receiving aperture defined by the inner annular interior border, wherein the inner flapper door includes a rearwardly extending tail that is arranged to extend away from the central axis of the nozzle-insertion housing when the inner flapper door occupies the closed position, a portion of the inner annular interior border is located in close proximity to the inner door-support pin, and the radially inwardly extending inner ledge and the inner annular interior border cooperate to define inner tail-receiver means for receiving the rearwardly extending tail of the inner flapper door in a hidden position under the radially inwardly extending inner ledge when the inner flapper door occupies the closed position so that the rearwardly extending tail of the inner flapper door is not exposed to a tip of a moving fuel-dispensing pump nozzle as the pump nozzle moves inwardly through the outer chamber and past the radially inwardly extending inner ledge to engage the inner flapper door and pivot the inner flapper door on the inner door-support pin from the closed position to the opened position during insertion of the tip of the pump nozzle through the inner nozzle-receiving aperture defined by the inner annular interior border into the inner chamber of the nozzle-insertion housing.

25. The filler pipe closure of claim 24, wherein the radially inwardly extending inner ledge includes a radially outwardly extending, axially inwardly facing bottom wall that cooperates with an adjacent axially inwardly extending, radially inwardly facing inner side wall of the inner annular interior border to define a boundary of the inner tail-receiver means.

26. The filler pipe closure of claim 25, wherein the inner annular interior border further includes an axially inwardly extending, radially outwardly facing outer side wall located between the inner door-support pin and the axially inwardly extending, radially outwardly facing inner side wall of the inner annular interior border.

27. The filler pipe closure of claim 25, wherein the inner flapper door includes a top plate comprising the radially extending tail of the inner flapper door and a tip-receiver segment coupled to a proximal end of the rearwardly extending tail of the inner flapper door and arranged to lie in an exposed position located in a nozzle-receiving channel bounded by the axially inwardly extending, radially inwardly facing inner side wall of the inner annular interior border to locate a distal end of the rearwardly extending tail of the inner flapper door in the inner tail-receiver means when the inner flapper door is in the closed position and wherein the nozzle-receiving channel is situated to interconnect the outer and inner chambers in fluid communication when the inner flapper door is in the opened position.

28. The filler pipe closure of claim 27, wherein the inner flapper door further includes a pivotable base supported on the inner door-support pin of the nozzle-insertion housing for pivotable movement about an inner door-pivot axis in the inner chamber and an O-ring seal mounted on a top side of the pivotable base of the inner flapper door and arranged to engage an underside of the inner annular interior border when the inner flapper door occupies a closed position to locate the rearwardly extending tail of the inner flapper door between a portion of the O-ring seal of the inner flapper door and the radially outwardly extending, axially inwardly facing bottom wall of the radially inwardly extending inner ledge.

\* \* \* \* \*